United States Patent
Pena et al.

(10) Patent No.: US 10,237,256 B1
(45) Date of Patent: Mar. 19, 2019

(54) DYNAMIC IDENTITY PROFILES

(71) Applicant: MicroStrategy Incorporated, Vienna, VA (US)

(72) Inventors: Victor Pena, Vienna, VA (US);
Gunther Brenes, Vienna, VA (US);
Siamak Ziraknejad, Reston, VA (US);
Thuy Le, Fairfax, VA (US)

(73) Assignee: MicroStrategy Incorporated, Vienna, VA (US)

( * ) Notice: Subject to any disclaimer, the term of this patent is extended or adjusted under 35 U.S.C. 154(b) by 214 days.

(21) Appl. No.: 15/006,949

(22) Filed: Jan. 26, 2016

Related U.S. Application Data

(60) Provisional application No. 62/108,009, filed on Jan. 26, 2015.

(51) Int. Cl.
*H04L 29/06* (2006.01)
*G06F 21/31* (2013.01)

(52) U.S. Cl.
CPC ............. *H04L 63/08* (2013.01); *G06F 21/31* (2013.01); *H04L 63/0884* (2013.01)

(58) Field of Classification Search
CPC ...... H04L 63/08; H04L 63/0884; G06F 21/31
See application file for complete search history.

(56) References Cited

U.S. PATENT DOCUMENTS

| | | | | |
|---|---|---|---|---|
| 2003/0187685 A1* | 10/2003 | Bakker | ............... | G06Q 30/02 705/1.1 |
| 2009/0138335 A1* | 5/2009 | Lieberman | ............. | G06Q 30/02 705/7.33 |
| 2009/0204434 A1* | 8/2009 | Breazeale, Jr. | ....... | G06F 19/328 705/3 |
| 2010/0185640 A1* | 7/2010 | Dettinger | ............... | G06Q 10/10 707/758 |
| 2014/0331282 A1* | 11/2014 | Tkachev | ................ | H04L 63/08 726/3 |
| 2015/0154647 A1* | 6/2015 | Suwald | ............. | G06Q 30/0269 705/14.66 |
| 2015/0281878 A1* | 10/2015 | Roundtree | ............ | H04W 4/008 455/41.2 |
| 2016/0358172 A1* | 12/2016 | Ziat | ...................... | G06Q 20/409 |

\* cited by examiner

*Primary Examiner* — Mohammad A Siddiqi
(74) *Attorney, Agent, or Firm* — Fish & Richardson P.C.

(57) ABSTRACT

Systems, methods, and apparatus, including computer-readable storage media storing executable instructions, for providing dynamic identity profiles are described. A dynamic user identity may be generated and updated in real time according to a user's interactions, interests, and various other suitable parameters. Contextual information, geo-fencing, beacon transmissions, and various other features may be used to acquire information that is included in the dynamic user identity and to provide more effective and intelligent interactions of the user with other devices based on the dynamic user identity.

20 Claims, 11 Drawing Sheets

DYNAMIC IDENTITY PROFILES

CROSS-REFERENCE TO RELATED APPLICATION

This application claims priority from and the benefit of U.S. Provisional Application No. 62/108,009, filed Jan. 26, 2015, which is incorporated by reference herein.

TECHNICAL FIELD

This disclosure relates to dynamic user identity profiles.

SUMMARY

The details of one or more implementations are set forth in the accompanying drawings and the description, below. Other potential features of the disclosure will be apparent from the description and drawings, and from the claims.

In general, one aspect of the subject matter described in this specification may include a computer-implemented method including operations of accessing a user identity profile for a user and updating the user identity profile based on one or more interactions of the user. The one or more interactions indicate one or more of an activity of the user, an interest of the user, and an interaction with an electronic system or device. The operations further include determining that a trigger condition has occurred, obtaining data corresponding to the trigger condition from the user identity profile in response to determining that the trigger condition has occurred, and controlling execution of one or more operations by the user device based on the data corresponding to the trigger condition.

In some implementations, accessing the user identity profile for a user includes determining whether the user identity profile is stored in an identity management database, generating the user identity profile in response to determining that the user identity profile is not stored in the identity management database, and providing data identifying the user device to the user identity profile in response to determining that the user identity profile is stored in the identity management database.

In some implementations, updating the user identity profile based on one or more interactions of the user includes updating one or more of basic user information, biometric information, medical information, health information, social information, behavioral information, commercial information, financial information, contextual information, and location information in the user identity profile.

In some implementations, updating the user identity profile based on one or more interactions of the user includes one or more of receiving a user input to configure one or more of a credential and a trigger condition, receiving contextual information for executing an operation, receiving an indication that an operation has been selected by the user for execution upon occurrence of the trigger condition, and receiving an indication that an operation has been selected for execution by the user device without user input upon occurrence of the trigger condition.

In some implementations, determining that the trigger condition has occurred includes determining that the trigger condition has occurred based on one or more of location information, calendar information, contextual information, user behavior, user interest, and user input.

In some implementations, obtaining the data corresponding to the trigger condition from the user identity profile in response to determining that the trigger condition has occurred includes one or more of accessing user history data, determining operations that were previously executed by the user device upon the occurrence of the trigger condition, and determining user preferences upon the occurrence of the trigger condition.

In some implementations, the one or more operations executed by the user device match the determined operations that were (i) previously executed by the user device upon the occurrence of the trigger condition, or (ii) indicated as preferred operations by the determined user preferences.

In some implementations, updating the user identity profile includes obtaining data indicating that the user possesses a credential associated with a credential issuer, and updating the user profile to include data associated with the credential. The data associated with the credential includes a badge indicative of the credential.

In some implementations, determining that the trigger condition has occurred includes receiving one or more of a beacon signal, a user input, or an indication of a location to activate the badge indicative of the credential.

In some implementations, obtaining the data corresponding to the trigger condition from the user identity profile in response to determining that the trigger condition has occurred includes obtaining contextual information that includes one or more of biometric information, credential information, motion information, analytics information, time information, third party information, optical data, transaction type, employer type, and access level type; obtaining data indicative of one or more operations performed in response to receiving the one or more of the beacon signal, the user input, or the indication of the location to activate the badge indicative of the credential; or obtaining data indicative of one or more user preferences when activating the badge indicative of the credential.

In some implementations, controlling the execution of one or more operations by the user device includes controlling the user device to display the badge, receiving a second input through the displayed badge, controlling execution of a function in response to the received second input, updating a display of the badge to reflect execution of the function, and updating the user profile based on one or more of the credential, the contextual information, the second input, and the executed function. The badge is customized based on the contextual information;

In some implementations, controlling the user device to display the badge that is customized based on the contextual information includes transmitting a message to a server associated with the credential issuer, receiving a validation message from the server associated with the credential issuer, and displaying the customized badge. The transmitted message includes credential information identifying the credential, identification information of the user device, location information of the user device, and user identification information. The validation message indicates that the credential has been validated and includes data for customizing the badge with the location information of the user device.

In some implementations, determining that the trigger condition has occurred includes determining that a location of user interest is within a threshold distance. The location of user interest is identified based on one or more of user history, user preference, and contextual information. The location of user interest includes one or more of a place visited by the user more than a threshold number of times, a place indicated by the user as being of interest, and a place determined to be of interest based on contextual information.

In some implementations, obtaining the data corresponding to the trigger condition from the user identity profile in response to determining that the trigger condition has occurred includes one or more of obtaining a credential that provides access to the location of user interest, obtaining biographical data including user identification data and age verification data that verifies an age of the user, obtaining financial data for providing one or more payments, and obtaining user preferences for responding to the trigger condition. The user preferences include a customized setting or a privacy setting.

In some implementations, controlling the execution of one or more operations by the user device based on the data corresponding to the trigger condition includes one or more of controlling the user device to output the age verification data such that the age verification data is output without outputting the age of the user based on the obtained user preferences, transmitting payment information to a server associated with an entity at the location of user interest based on the financial data, transmitting the credential and user identification data to access the location of user interest, and wirelessly communicating with another user device located at the location of user interest based on the customized setting or the privacy setting. The wireless communication includes transmitting the user identification data to the other user device.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DETAILED DESCRIPTION

Figure 1:
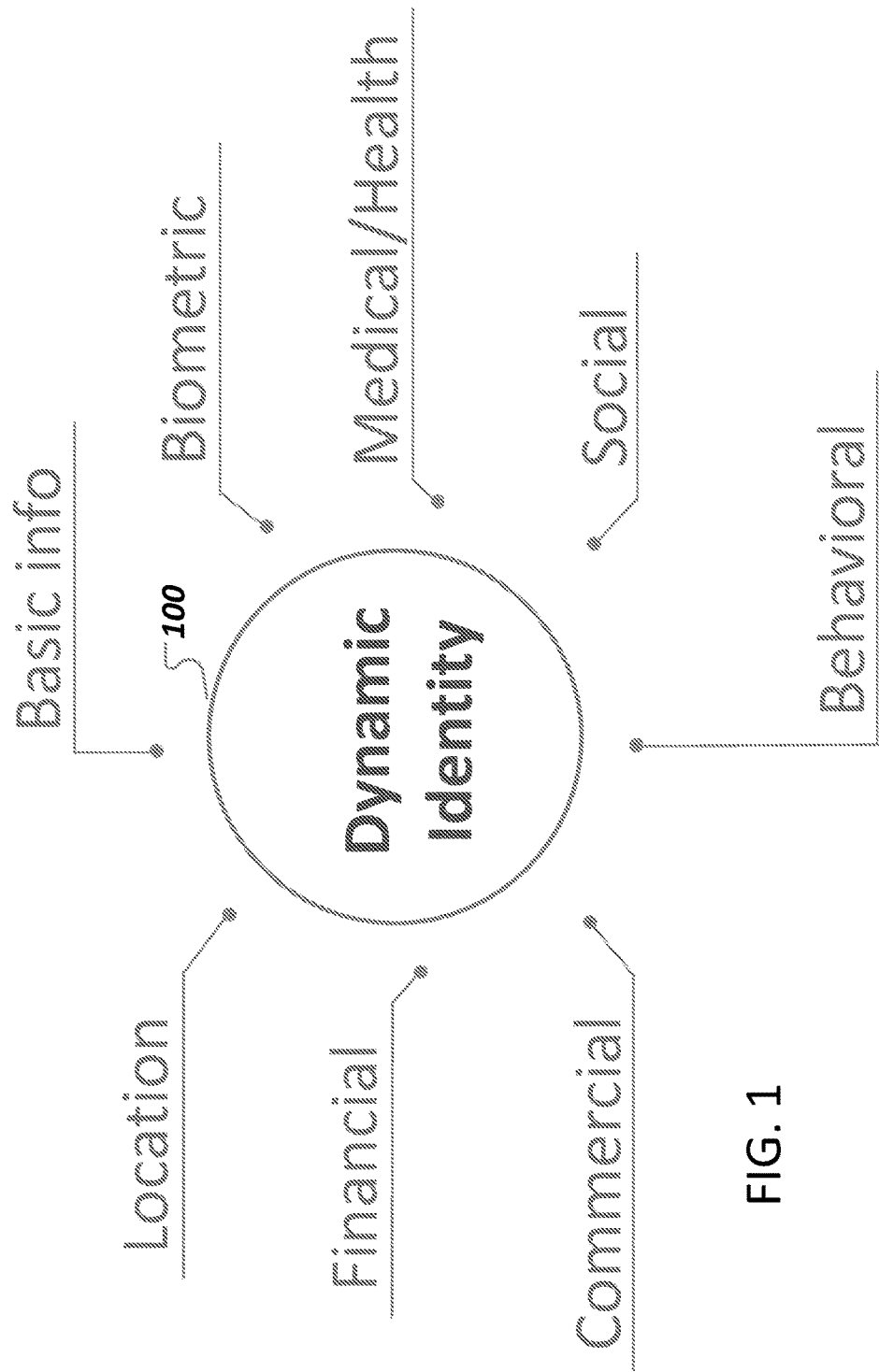
FIG. 1 illustrates an example of aspects of a user identity profile.

A method and system for generating and updating a dynamic user identity are disclosed. The dynamic user identity may be generated and updated over time according to a user's interactions, interests, and various other suitable parameters. The dynamic user identity may be configured by a user identity application installed on an electronic device, such as a phone, associated with the user. Contextual information, geo-fencing, beacon transmissions, and various other features may be used to acquire information that is included in the dynamic user identity and to provide more effective and intelligent interactions of the user with other devices based on the dynamic user identity.

In general, a dynamic user identity can include a user profile or collection of data about a specific user. The profile can include information about who the user is, what the user's preferences are, behavior of the user, and other information. The user identity or user profile is considered to be "dynamic" because it can include up-to-date, real-time information about, for example, the user's location, activities, and preferences. Thus the dynamic user identity is refined and updated according to each of the various interactions that are detected by the user's device, e.g., phone, or other devices that detect the presence of or activities of the user. The user identity can be an evolving, personalized, contextualized profile that enhances interactions of the user with other devices in the user's environment.

As more and more devices become networked, new capabilities for detecting conditions and taking action automatically become available. The potential for useful interactions is enhanced if a user can easily or even automatically establish his or her identity, which may permit networked devices to customize their interactions for the characteristics and preferences of the specific user that is present.

In some implementations, data from the dynamic user identity may be combined with one or more types of contextual information to configure a user interaction. A user interaction may be configured, for example, by providing a streamlined or enhanced user interface, providing personalized options for interaction, and customizing user preferences, user environment and/or user behavior. In some implementations, a system may make decisions based on the credentials of a particular user, as well as contextual information such as location information (e.g., a users current location, or proximity to the user's residence or office), time information (e.g., day time or night time), and user activity information (e.g., user behavior such as walking, driving, riding a bike) to automate or otherwise adjust the way various devices interact with the user.

Systems that access the user identity information can combine, for example, location information, credential information, and behavior information to automate tasks and enhance a user's experience. For example, a profile for a user may indicate that the user has the credential to access a particular building, and that the user typically enters from the south entrance between 8 am and 10 am on weekdays. When the user's phone detects that the user has arrived at the building and is walking toward the south entrance, the system can determine, based on the user's identity information, that the user is authorized to enter the building and that the current time and location match the user's usual behavior patterns. In response, the server system may cause an interface to be displayed on the user's phone to allow a one-touch unlocking of the south entrance door, or even unlock the door in response to the user's presence without any user input.

A dynamic user identity may be formed by receiving data associated with user interactions, processing the data to create an identity for a user, and using the received data to facilitate current and future interactions of the user. This received data may be obtained from servers, computers, or other electronic devices the user identity application communicated with as is indicative of at least one aspect of the user's identity. A history of the user's interactions may also be utilized to customize or prioritize current and future interactions of the user. The user identity application may apply contextual information and/or obtain user input to ensure that relevant data for an interaction is transmitted or received thereby providing the user with smarter and more effective interactions and experiences. Contextual information may be obtained from various interactions and may include, for example, location information, biometric information, motion information, analytics information, time information, third party information, optical data, workflow type, transaction type, employer type, and occupation type.

Referring to FIG. 1, a dynamic identity 100 (hereinafter interchangeably referred to as "identity") can be derived from any combination of user data and, in some cases, may vary according to a time element. The identity 100 may include data indicating basic information of a user, biometric information, medical health information, social information, behavioral information, commercial information, financial information, location information, relationship information, interest information, and various other types of information of the user.

The basic information of a user may include, but is not limited to, for example, a name, date of birth, social security number, sex, address, driver's license information, passport data, occupation, and employer, etc.

The biometric information may include, but is not limited to, for example, a picture of the user, a scan of one or more of the user's fingerprints, one or more iris images of the user's eye, a face image of the user, gait information for the user, handwriting features of the user's handwriting, voice-prints of the user, and various other types of biometric data.

The medical health information include, but is not limited to, for example, medical, dental, and vision insurance data (e.g., policy number, group number, ID number, etc.), information on doctors (e.g., preferred doctors, frequently visited doctors, primary care doctors, family doctors, etc.), information indicative of any allergies, diseases, or treatments of the user, and various other suitable types of information associated with medicine or health.

The social information may include, but is not limited to, for example, contact information of the user's friends and family, information indicative of the social networks of which the user is a member of, information indicative of a faith or belief of the user, information indicative of an occupation of the user, an employer of the user, a business of the user, a social schedule of the user, relationships of the user, likes and dislikes of the user, and various other suitable types of information associated with the user's social environment.

The behavioral information may include, but is not limited to, for example, information indicative of the user's interests (e.g., sports, music, etc.), the user's activity pattern in a set time period, the user's activities (e.g., membership at a local bar, community service and volunteer activities, etc.), and various other suitable types of information associated with the user's behavior.

The commercial information may include, but is not limited to, for example, information indicative of retail outlets, restaurants, places, and other entities the user has visited or may be interested in.

The financial information may include, but is not limited to, for example, bank account information, stock market information, investment portfolios, and various other types of financial information the user may be associated with or interested in.

The location information may include, but is not limited to, for example, a record of one, multiple, or all the locations the user has visited. The location information may indicate a place of birth of the user, places visited and when they were visited, and typical paths traveled by the user (e.g., a particular user goes from work, to home, then to the gym.) The location information may also include data associated with locations the user has indicated as being destinations.

The relationship information may indicate family members, friends, professional contacts, people that participate in a particular activity or faith, organization membership, and so on.

Interest information can indicate, for example, ratings and likes in social media platforms, employment history, loyalty card information, browsing histories, purchase histories In general, information used to generate, update, or modify a user's identity 100 may include any type of information associated with a user. The timing of interactions and events can also be recorded. The information may be obtained from various sources including, for example, input received from the user, interactions with other electronic devices, systems, and elements (e.g., Global Positioning Satellites, servers, computers, etc.), and data received from other networks or individuals.

A user's dynamic identity 100 may be accessed and configured, in part, by a user identity application, such as, for example, USHER, which can be installed on one or more electronic devices of the user through any suitable operation system (e.g., iOS, Android). The electronic devices may include, for example, a smart phone, a television, a wearable electronic device (e.g., smart watch), smart glasses (e.g., Google® glasses), a laptop, and, in general, any electronic device capable of connecting to one or more networks. Upon logging in or launching the user identity application on a user device, a user may access all portions of the user's dynamic identity 100, which is updated in real time.

The user identity application may also provide credentials associated with one or more of the above-noted categories of information. The credentials can be, for example, identity credentials (driver's licenses, passports, visas, police badges etc.), health insurance cards, loyalty cards, badges reflecting membership in a group (e.g., employees of a company, graduates of a college, gym club memberships, etc.), badges to gain entrance to a location or event, a ticket for entry to a location or event, a key that unlocks a lock (e.g., for entry to a location), etc. The credentials can be represented in various forms. For example, credentials can be represented by parametrically-generated graphical representations, animated graphical representations, phrases, numeric representations, and/or optical machine-readable representations (e.g., bar codes or QR codes). A server, or collection of servers, can manage and distribute credentials to one or more devices of the user.

Different credentials may be issued by different credential issuing organizations. For example, a company may have an associated credential issuing organization issuing credentials for its employees that are used for accessing various company resources, whereas a physical fitness chain may have another associated credential issuing organization that issues credentials to its members for accessing the fitness centers managed by the chain. The credentials issued by different credential issuing organizations may be managed using the credential management system, which enables a first user of the credential management system to validate a credential presented by a second user of the credential management system irrespective of the credential issuing organization that issued the credential. Responsive to successful validation of a credential, information associated with the validated credential (including information about the credentialed second user) may be disseminated to the validating first user.

Data associated with a user's dynamic identity 100 may be stored in a database connected to or integrated with an identity management server, which is connected to one or more of the user's devices through one or more networks. The one or more networks may provide network access, data transport, and other services associated with the one or more networks. In general, the one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof. Communications between a user device, other devices, the identity management server, or one or more network elements may also be performed through various wireless network technology standards, such as Bluetooth.

The one or more networks may include one or more databases, access points, servers, storage systems, cloud systems, and modules. For instance, the one or more networks may include the identity management server, which may include any suitable computing device coupled to the one or more networks, including but not limited to a personal computer, a server computer, a series of server computers, a mini computer, and a mainframe computer, or combinations thereof. The identity management server may be used for and/or may provide cloud and/or network computing. Although not shown in the figures, the server may have connections to external systems providing messaging functionality such as e-mail, SMS messaging, text messaging, and other functionalities, such as advertising services, search services, etc.

FIGS. 2-7 illustrate examples in which the user identity application is used to complete one or more interactions of the user. Although the following examples are described with respect to an employee, customer, or tourist, it should be understood that the employee, customer, and tourist are examples of a user of the user identity application.

Figure 2:
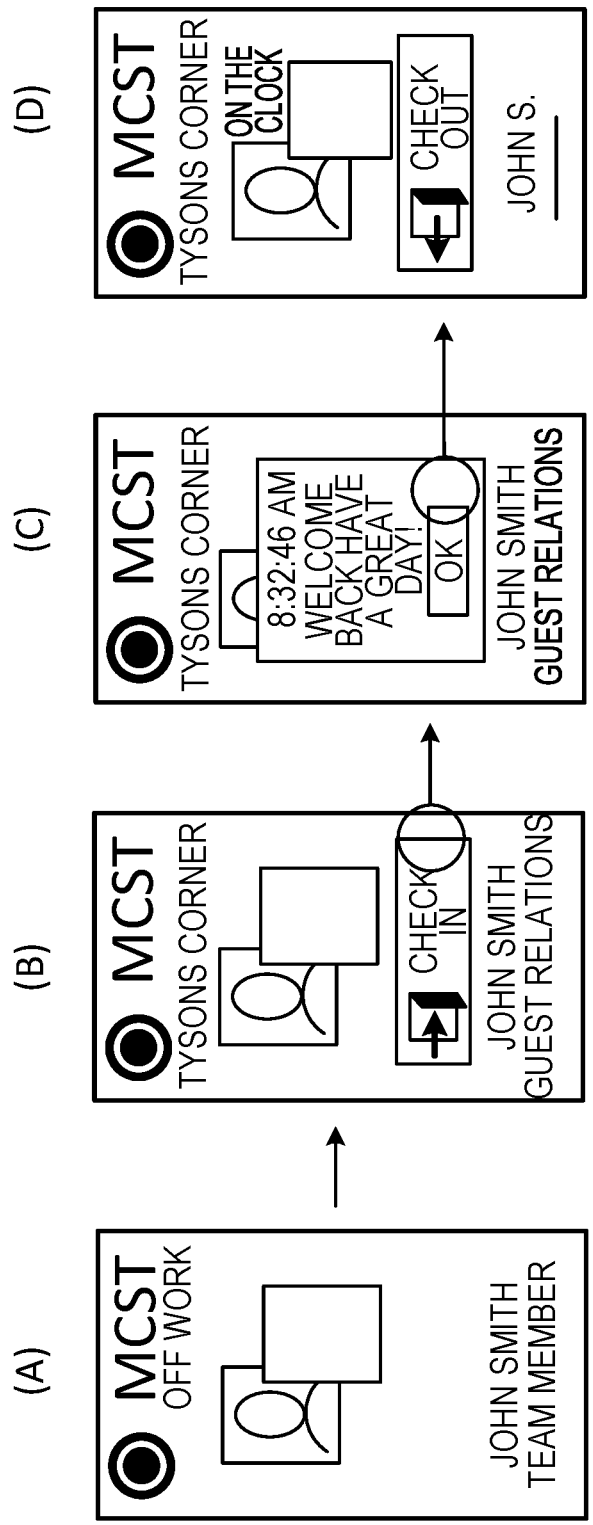
FIG. 2-8 illustrate examples of user interfaces showing uses of a user identity profile.

Referring to FIG. 2, in some implementations, the user identity application may be used in an enterprise environment to perform one or more operations. For example, an employee of an enterprise (e.g., MCST) may use the user identity application to check-in or check-out of an enterprise facility. When away from an enterprise facility, a badge associated with a credential issued to the employee by the enterprise may reflect an "Off Work" status, as shown in image (A) of FIG. 2. The badge is displayed through the user identity application on the employee's device (e.g., mobile phone). The badge may also display additional information such as the enterprise name (e.g., MCST) and logo, user name (e.g., John Smith), a Quick Response (QR) code, and a position (e.g., team member) of the employee in the enterprise.

Information that is provided through the user identity application can be customized according to the context that the user is in, in ways that are appropriate for the specific credentials and preferences indicated by the dynamic user identity. For example, when the employee is in proximity to the enterprise facility where the employee works, the user identity application customizes the badge to display an option for the employee to check-in ("Check-in" button), as shown in image (B) of FIG. 2. To detect a proximity to the enterprise facility, various suitable methods may be used as described below.

For example, in some cases, the employee's device may determine a location of the employee's device using any suitable location service (e.g., Global Positioning System (GPS)), and may customize the badge in response to determining that a location of the employee's device is within a threshold distance (e.g., 100 meters) of the enterprise facility. In some cases, upon crossing an enterprise's geo-fence (i.e., a virtual perimeter for a real-world geographic area), the employee's device may send a signal to a server of the enterprise's network that includes information about employee's credential and identification information, and the employee's device identification and location. The server of the enterprise's network may then send a signal to the employee's device for customizing the employee's badge if the employee has a validated credential of the enterprise. It should be understood that the employee's device may customize or display a badge if the employee has been issued a credential and badge of the enterprise. If information in the employee's badge has changed, the employee's badge may be updated to reflect the changes. For example, in image (B) of FIG. 2, the position of the employee has been updated to a different position (e.g., guest relations). The employee's badge may also reflect an address (e.g., Tysons Corner) of the enterprise.

After the employee selects the option for check-in, the user identity application controls the employee's device to send a signal to the server of the enterprise's network indicating that the employee would like to check-in. The server may respond to the employee device with a confirmation message. As shown in image (C) of FIG. 2, the confirmation message may include a time of the check-in as well as a message (e.g., welcome back).

After displaying the confirmation message, the user identity application controls the employee's device to subsequently display a check-out button on the employee's badge, as shown in image (D) of FIG. 2, or may display the check-out button after receiving an input from the employee indicating that the employee would like to check-out. The input may be received through various suitable means (e.g., audio input, touch input on a check-out icon, etc.).

Figure 3:
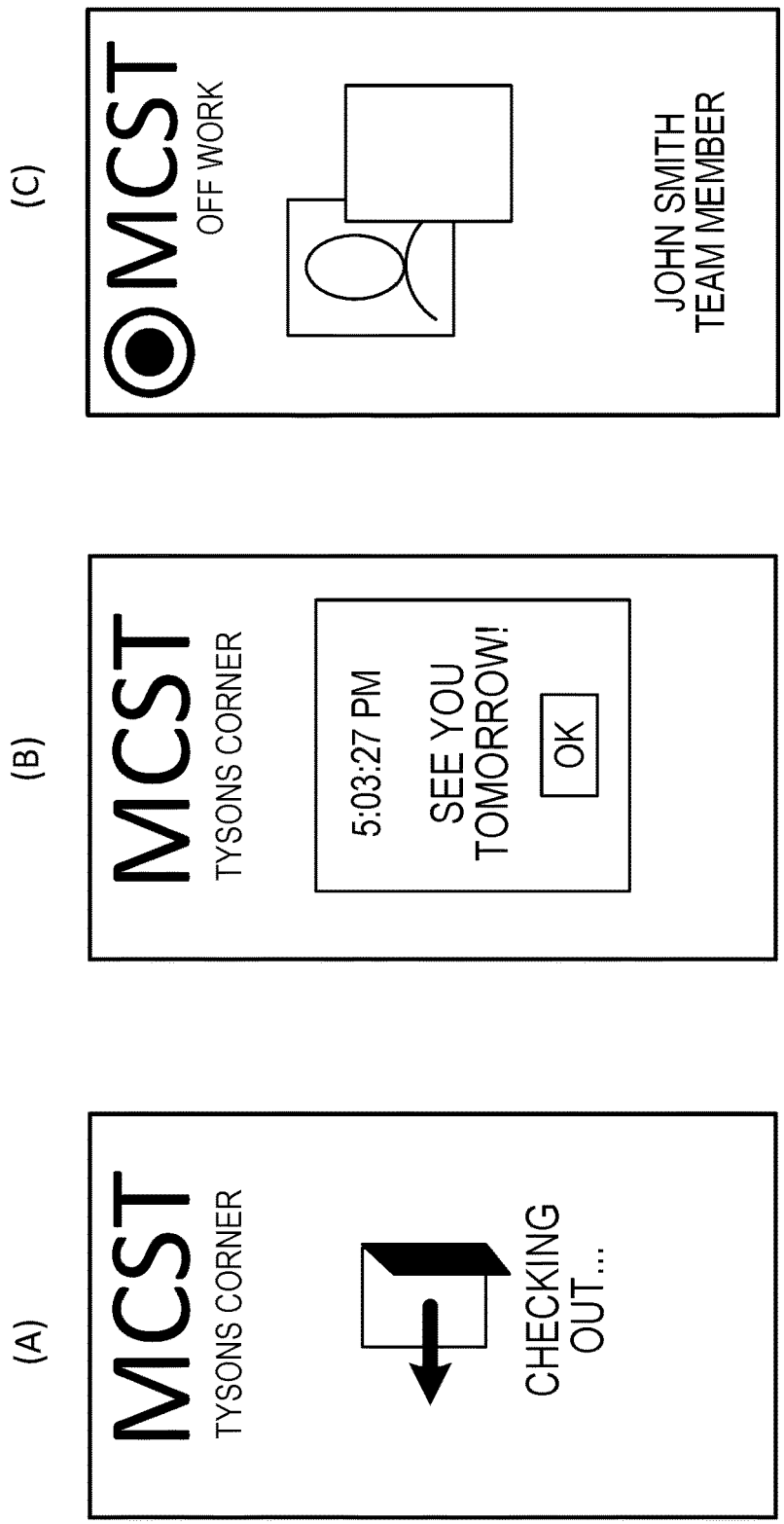

After selection of the check-out button, the employee's device may display a check-out in progress image, as shown in image (A) of FIG. 3, and transmit a signal to the server of the enterprise's network indicating that the employee would like to check-out. In some cases, when the user identity application in the employee's device detects that the employee is leaving the enterprise facility (e.g., walking in the parking lot) or is exiting the enterprise's geo-fence, the user identity application may, without receiving any user input, control the employee's device to transmit a signal to the server of the enterprise's network indicating that the employee would like to check-out.

The server of the enterprise's network may respond to the employee device with a confirmation message. As shown in image (B) of FIG. 3, the confirmation message may include a time of the check-out as well as a message (e.g., see you tomorrow). The employee device may subsequently return to displaying a badge reflecting an "Off Work" status, as shown in image (C) of FIG. 3.

The server of the enterprise's network may maintain a log of the check-in and check-out times for all its employees. Also, the user identity application on each employee's device may maintain a log of the respective employee's check-in and check-out times. Thus, employees and employers have a much easier technique to track a number of hours worked by employees and no longer have to rely on time cards with manual actions to punch in and punch out.

While the example of FIG. 3 describes a scenario where an employee is entering or leaving an enterprise facility, the user identity application can be customized according to different work flows or time of day as well. For instance, using the employee's travel history maintained by the user identity application, the user identity application may customize the enterprise badge on the employee's device to display a check-in option during a certain time period (e.g., 8-9 AM) if the employee most frequently checks in at that time period. In some cases, the user identity application may customize the enterprise badge on the employee's device to display a check-out option during a certain time period (e.g., 5-6 PM) if the employee most frequently checks out at that time period.

Figure 4:
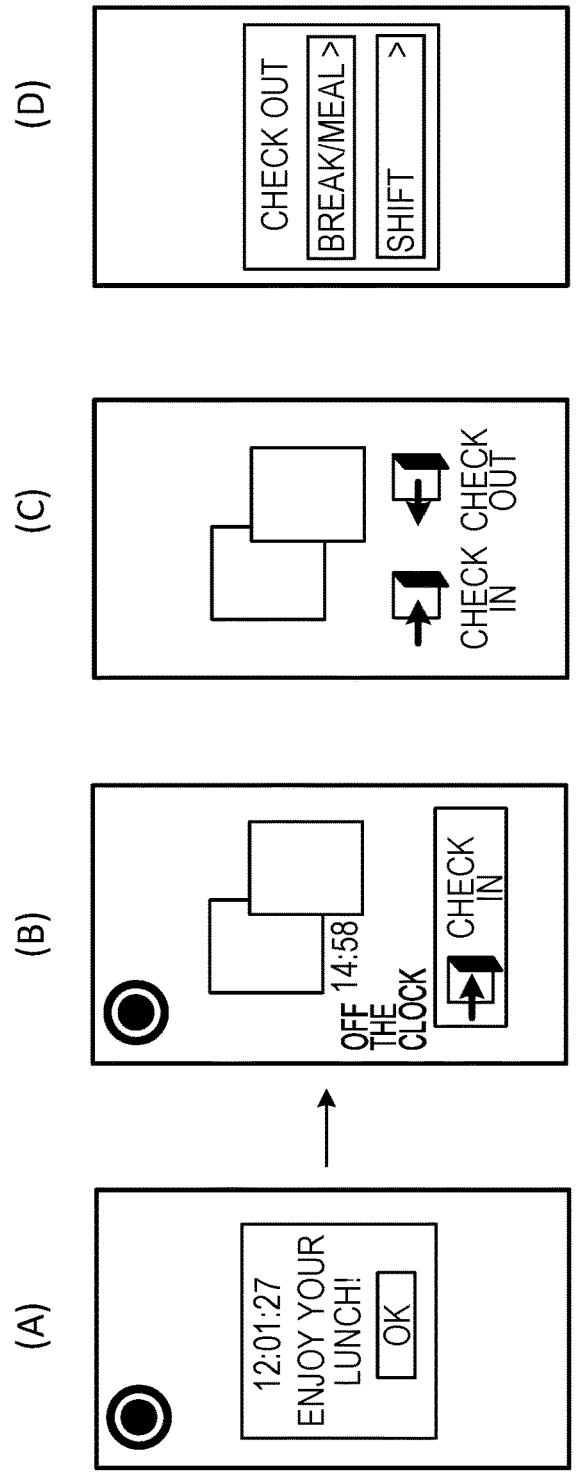

Referring to FIG. 4, in some cases, as shown in image (A) of FIG. 4, the user identity application may control the employee's device to display a message (e.g., enjoy your lunch) indicating that a time at which the employee normally checks out (e.g., to have lunch) has arrived. Furthermore, if the employee selects an option to check-out, the user identity application may track an amount of time the employee has been checked out. For example, as shown in image (B) of FIG. 4, the user identity application may control the employee's device to display the amount of time (e.g., 14:58) the employee has been checked out, and a check-in button. In this manner, an employee can easily monitor how long a period the employee has been checked out for.

Furthermore, during a business day, the user identity application may implement different user interfaces on the employee's device according to a workflow type of the employee. For instance, in some cases, throughout regular business hours of an enterprise, a check-in and a check-out option may be displayed on the employee's device. If the employee selects one of the options, the employee may be further prompted to select a subsequent workflow. As an example, as shown in image (C) of FIG. 4, check-in and check-out buttons may be displayed on an employee's device. If the employee selects the check-out button, a check-out interface may be displayed with one or more workflow options. The displayed workflow options may be determined according various factors, including, for example, the employee's history of interactions (e.g., a type of workflow most frequently selected by the employee or a type of workflow most frequently selected by the employee at a time point when the check-out option was selected) or a type of workflow requested or input by the employee. As shown in image (D) of FIG. 4, the employee's device is displaying "Break/Meal" or "Shift" workflow options to check-out from. The employee may then complete the check-out by selecting one of the workflow options.

The user identity application may be implemented in various other manners. For example, as will be described below, a user of the user identity application may customize the type of information being exchanged based on various parameters (e.g., location type, credential type, etc.). A user may also customize a credential to control the execution of applications within a badge of the credential. In addition, beacons associated with credentials may be used to expedite transactions with a credential issuing organization associated with the credential.

Figure 5:
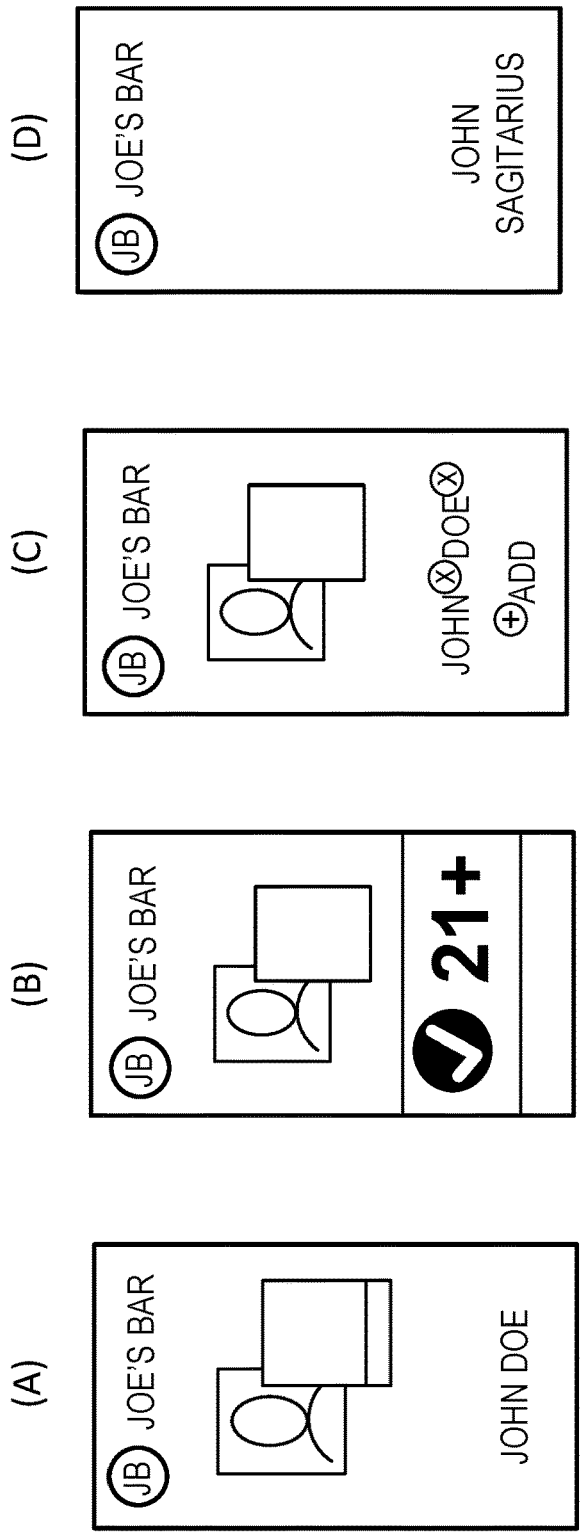

Referring to FIG. 5, in one example, as illustrated in image (A) of FIG. 5, a customer (e.g., John Doe) may have a badge corresponding to credential associated with a location of user interest, such as a restaurant (e.g., Joe's Bar). The location of user interest may be identified based on one or more of a user history of visiting the location, a preference provided by the user that indicates an interest in the location, or contextual information (e.g., time information, user routine information). A location may be determined to be of interest by the user device if the user visits the location more than a threshold number of times or visits the location with a greater frequency relative to other locations in the same business category (e.g., restaurants).

Referring to the example of a restaurant, using any suitable location service or geo-fencing services associated with the restaurant, when the customer approaches the bar for purchasing alcohol beverages, the user identity application on the customer's device may control the customer's device to display an age verification message (e.g., "21+"), as illustrated in image (B) of FIG. 5. In some cases, the customer may not want to disclose the customer's date of birth, therefore, the customer may customize settings of the user identity application to specify that the customer's date of birth should not be displayed in an age verification message. This setting may be applied to the credential associated with this restaurant (e.g., Joe's Bar) or with all business and retail locations based on the customer's preference. In some cases, the customer may want to disclose the customer's date of birth. Therefore, the customer may customize settings of the user identity application to specify that the customer's date of birth should be displayed in an age verification message.

In addition to the example of an age verification message, the customer may specify the type of information or data the customer would like to share. For example, the customer may choose to display a name and picture of the customer while in the restaurant, as illustrated in image (C) of FIG. 5. However, when another function is performed, such as a peer-to-peer discovery function, to meet other people in the restaurant, the customer may have customized settings of the user identity application to display additional information (e.g., horoscope information of the customer), as illustrated in image (D) of FIG. 5. Accordingly, the customer can configure one or more of privacy settings, the type of personal information being shared, the manner in which the personal information is shared, and the circumstances (e.g., operations) in which the information is shared using the user identity application.

Figure 6:
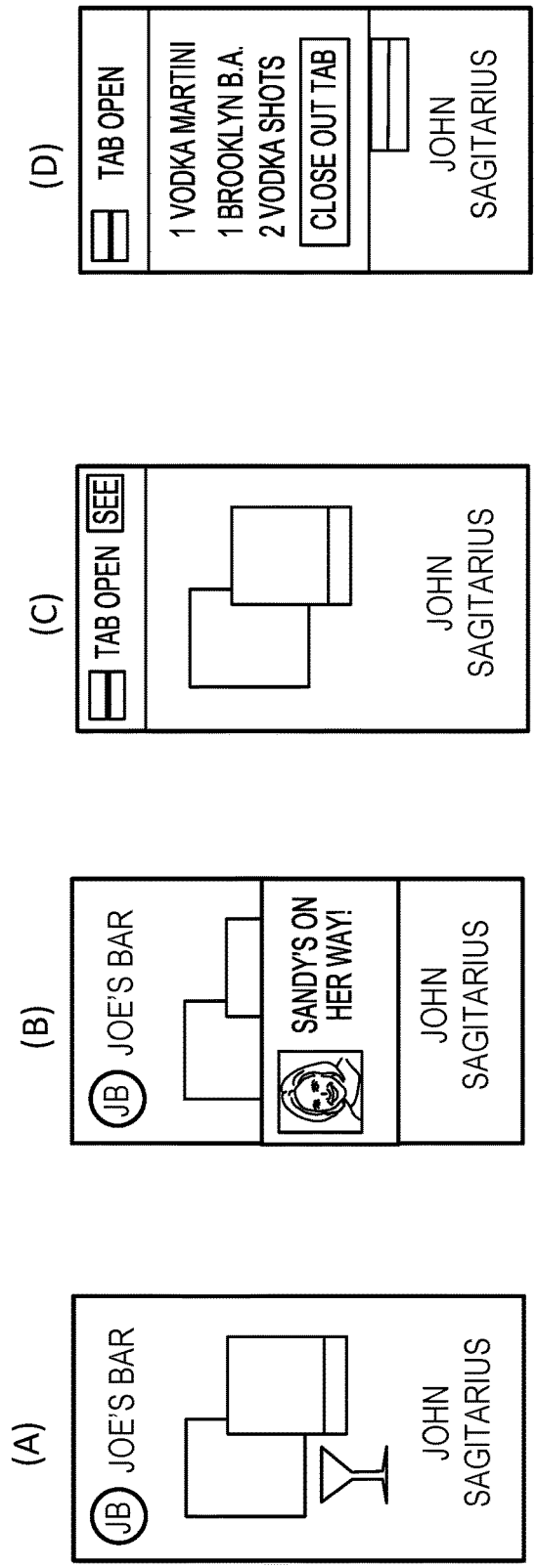
Figure 7:
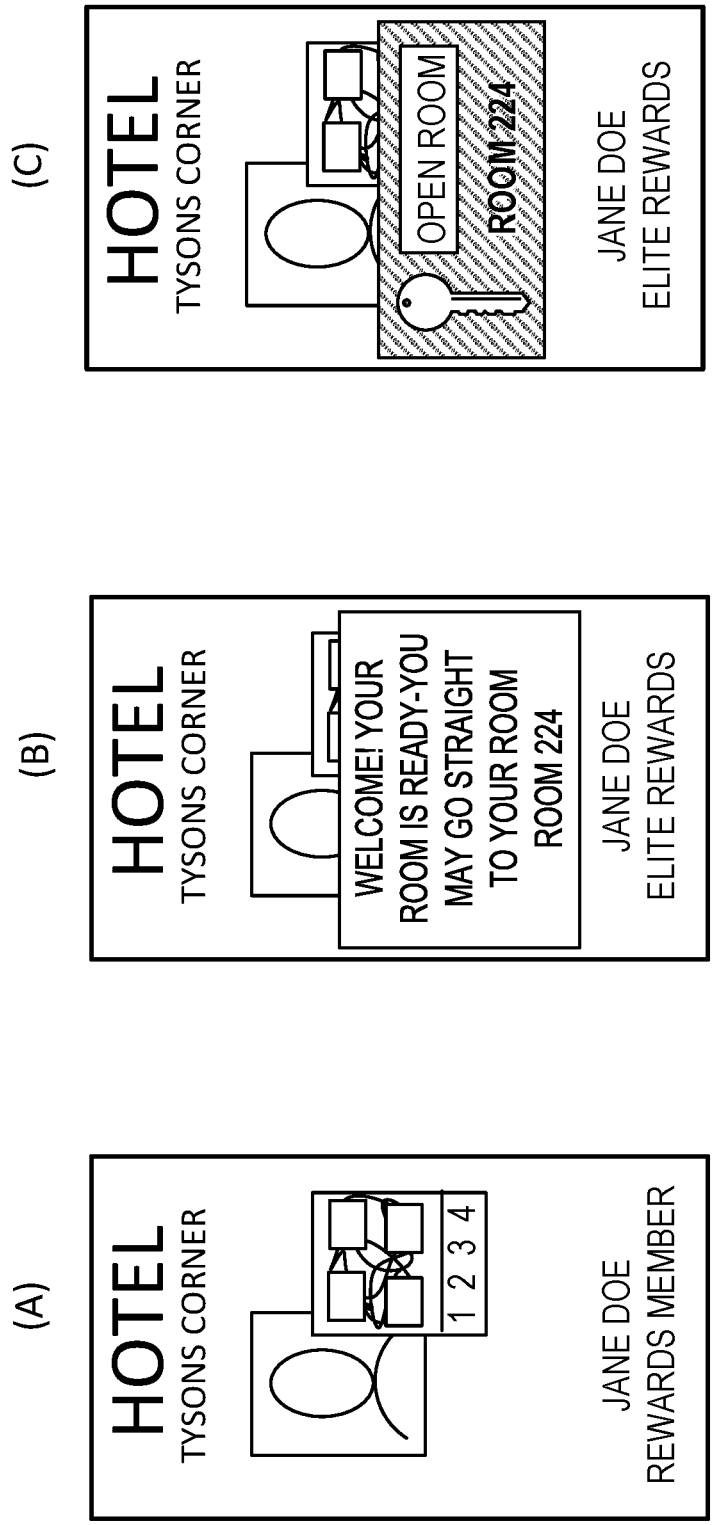

Furthermore, as shown in FIG. 6, the customer may configure the badge associated with the restaurant credential to execute one or more applications. For instance, upon entry of a bar, the customer's device may provide an icon that the user may select to order drinks (image (A) of FIG. 6). For example, by selecting an icon, the user may call a waiter over. In image (B), a message appears when a waiter is assigned to the user. The application may allow the user to send or receive messages to a staff member of the restaurant. In user interface (C), the device shows a visual cue that a bar tab is open and pending, and in user interface (D) the device provides an interface that a user can use to pay the tab.

In another example, a tourist (e.g., Jane Doe) may have a credential associated with a hotel. Using any suitable location service or geo-fencing services associated with the hotel, when the tourist approaches the hotel for checking into the hotel, the user identity application on the tourist's device may control the tourist's device to display a badge corresponding to a credential associated with the hotel, as illustrated in image (A) of FIG. 7. When the tourist enters one of the entry points of the hotel, the tourist's device may receive a beacon signal (e.g., a Bluetooth® beacon signal) from a beacon transmitter controlled by a network of the hotel. In response to the beacon signal, the user identity application on the tourist's device controls the tourist's device to transmit to, a server of the hotel, a notification message that includes information identifying the received beacon signal, the tourist device, and information indicating an identity of the tourist. The server of the hotel may extract an identity of the tourist from the notification message, and perform the hotel's check-in procedure. The check-in procedure may include obtaining credit card information or other financial information from the tourist's device by sending and receiving additional messages (e.g., signals) with the tourist's device. After the check-in procedure is complete, the server of the hotel may send a push notification to the tourist's device that includes a message indicating that the check-in procedure for the tourist is complete. After receiving the push notification from the server of the hotel, the user identity application on the tourist's device may control the tourist's device to display a message indicating that the tourist is checked-in, as illustrated in image (B) of FIG. 7.

When the tourist reaches within a threshold distance (e.g., 10 feet) of the tourist's room, another beacon signal is received from a beacon transmitter situated near the tourist's and controlled by the hotel's network. In response to receiving this beacon signal, the user identity application on the tourist's device may control the tourist's device to display a representation of a key to the tourist's room, as illustrated in image (C) of FIG. 7. The tourist may then select the key with a touch input on the tourist's device to indicate that a door to the tourist's room should be opened. Then, the tourist's device may control the tourist's device to transmit a signal to, a server of the hotel, to open a door to the tourist's room. The hotel server may then activate a lock to the tourist's room and open the room. This tourist example illustrates that a user identity application enables a seamless and expedited experience for a user to check into a hotel.

Figure 8:
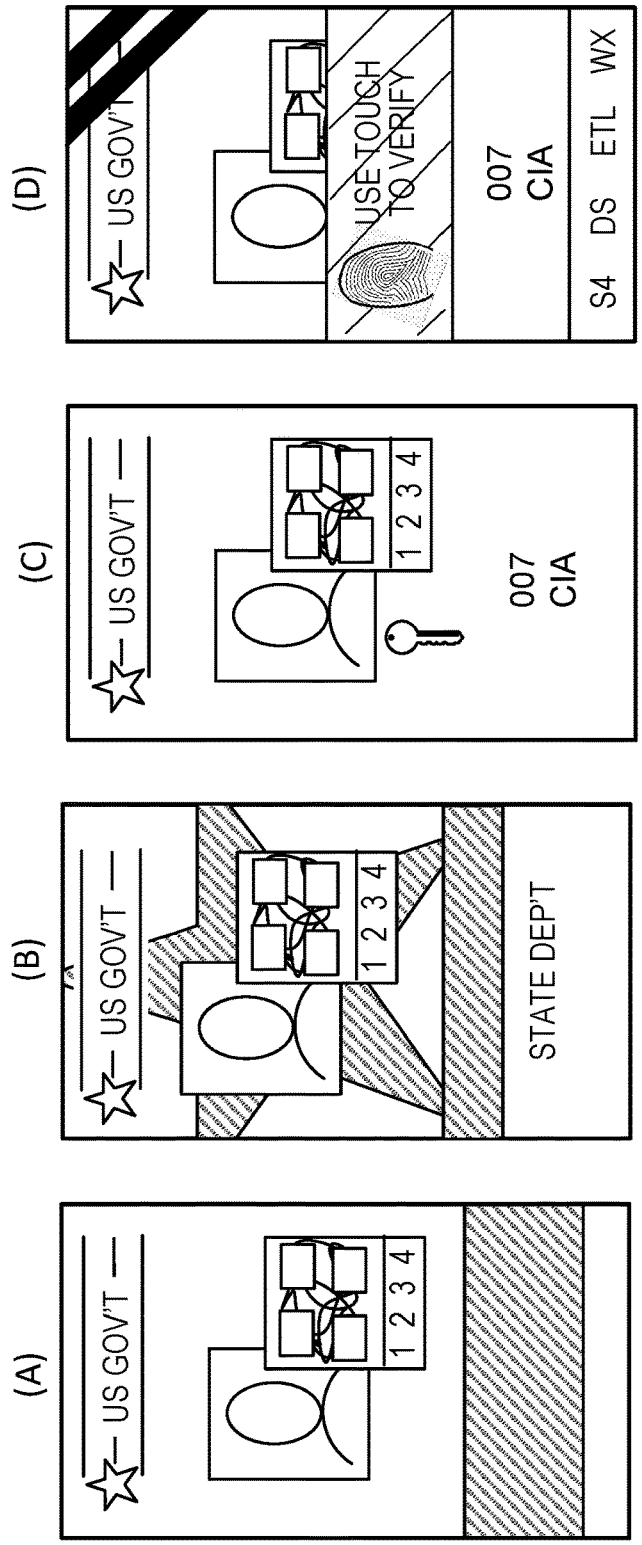

In FIG. 8, context awareness and user identity information can be used to provide secure government access. In user interface (A), the user's name and affiliation are hidden until needed. In user interface (B), upon entering a government building, the background of the user interface changes and the affiliation is revealed. In user interface (C), the full name may be visible only in or near secure areas. Time restrictions may trigger the availability of keys associated with the user. In user interface (D), extra authentication may be performed for specific access, and visual indicators of approved access level and approved resources may be displayed and removed as authentication and expiration occur.

As can be appreciated from the foregoing examples, a user identity application may be used to provide more effective and intelligent user interactions through the use of contextual information, geo-fencing, beacon transmissions, and various other features. Hereinafter, a flowchart illustrating a method for providing dynamic identity profiles is shown with reference to FIG. 9.

A user device may receive an input from a user indicating that the user would like to download a user identity application (UIA) on the user device (902). In some cases, the input from the user may be an audio input, such as a voice command requesting download of the UIA. In some cases, the user may request the download of the UIA by selecting a download link through, for example, a website, an application store, or any other suitable means for obtaining the UIA.

The user device may include but is not limited to, for example, a smart phone, a television, a wearable electronic device (e.g., smart watch), smart glasses (e.g., Google® glasses), a laptop, or, in general, any electronic device capable of connecting to one or more networks.

In response to the input received from the user indicating that the user would like to download the UIA on the user device, the user device installs the UIA (904). To install the UIA, the user device may communicate with one or more networks, servers, and/or databases and execute one or more operations and protocols to download data for installing the UIA on the user device.

After installation, to initiate the UIA, the user device may prompt the user to enter basic information about the user (906). For example, the user device may prompt the user to enter basic information such as a name, date of birth, social security number, sex, address, driver's license information, passport data, occupation, and/or employer of the user. In some cases, the user may, without being prompted by the user device, enter basic information of the user through a graphical user interface (GUI) provided by the UIA (906).

Upon initiation of the UIA and receipt of the user's basic information, the user device transmits a message to an identity management server or database to create a user identity profile (908). The transmitted message includes at least a portion of the user's basic information, including user identity information, such as for example, a name and date of birth of the user. When the identity management server or database receives the message from the user device, the identity management server or database determines whether an identity profile for the user already exists. If an identity profile for the user already exists, the identity management server or database updates the user identity profile by adding identification information of the user device to the user identity profile. The identification information of the user device may include, for example, an Internet Protocol (IP) address or any suitable device identification of the user device. If an identity profile for the user does not exist, the identity management server or database creates a user identity profile and includes the user identity information in the identity profile. The user identity profile may be associated with one or more user devices.

In some implementations, a user identity profile may be maintained in the user device and may be periodically synced with a user identity profile in the identity management server or database. The synchronization may occur at any suitable period of time or, in some cases, may be performed each time the user identity profile is updated or modified.

Next, the UIA directly and indirectly monitors the movements and actions of the user device and user to dynamically update the user identity profile (910). In some implementations, the updates are made in real-time, for example, concurrent with the actions being performed by the user. Exemplary scenarios of user identity profile updates have been described above. Additional examples are described below.

For example, the UIA may cause the user identity profile to be updated to include information regarding one or more credentials assigned to the user, a dining place frequented by the user, a retail store frequently visited by the user, user's activities (e.g., membership at a local bar, volunteer activities, etc.), and a user's place of employment or residence. In general, as described above, the user's dynamic identity profile may include basic user information, biometric information, medical/health information, social information, behavioral information, commercial information, financial information, and location information. In some implementations, the UIA collects or organizes information and then send information to a server system that maintains the user identify profile. In some implementations, the UIA itself makes updates to a user identity profile, for example, stored at the user device.

In some implementations, the user identity profile may be updated by the user. For example, the user may input information to configure a credential, provide contextual information, or set a trigger condition. For example, the user may indicate that a badge associated with a enterprise credential should be transmitted to an enterprise server when the user device detects that a location associated with the enterprise is within a threshold distance. In another example, the user may specify one or more membership cards or accounts to be used at one or more retail stores. In another example, the user may provide contextual information such as day and time information for performing an operation or for setting a trigger condition. In this manner, a user may configure the UIA to perform certain actions when certain conditions occur. As discussed above, in addition or as an alternative, the UIA and an associated server system may determine actions to be performed and corresponding trigger conditions based on analysis of user behavior patterns.

In some implementations, the user identity profile may be updated with an indication that an operation has been selected by the user for execution or with an indication that an operation has been selected for execution by the user device without user input.

Simultaneously or sequentially to when the dynamic user identity profile is updated, the user device may monitor for the detection of a trigger condition (912). The trigger condition may be one of several conditions. For example, based on geofencing technology, a trigger condition may be detected when the user device approaches a particular location. For example, the location may be a location frequently visited by the user such as, for example, a location of restaurant, retail store, place of employment, or residence of the user. Other examples of a trigger condition include, but are not limited to, a time of day when the user frequently performs an activity, a behavior or interest (e.g., favorite song) frequently engaged in by the user, and a credential accessed by the UIA. Trigger conditions may be determined based on user history, contextual information, or may be identified, selected, or input by the user through the GUI of the UIA.

When a trigger condition is detected, the user device retrieves data related to the trigger condition from the user profile (914). In some implementations, data retrieved from the user identity profile that may include user history data. User history data may include data indicative of operations that were previously executed by the user device upon the occurrence of a trigger condition or user preferences during the occurrence of a trigger condition. For example, as described above, when the user device detects that a place of employment or enterprise is within a threshold distance, the user device may obtain a credential associated with the place of employment. As another example, when the user device detects that the time of day is 9 AM on a weekday, which may generally be the time when the user commutes to work, the user device may obtain identification data identifying a media file (e.g., song, radio show, podcast) that the user typically listens to on the user's commute to work. As another example, when the user device detects a trigger condition such as being within a threshold distance of a bar frequently visited by the user, the user device may obtain financial data (e.g., credit card information) and biographical information (e.g., age verification information) from the user identity profile. In general, various suitable data that may provide information related to the trigger condition may be obtained from the user identity profile.

After retrieving data from the user identity profile, the user device may control the UIA to execute one or more operations (916). The one or more operations may be determined from the data retrieved from the user identity profile. In some implementations, the one or more operations may match operations that were previously executed by the user device upon the occurrence of a trigger condition. In some implementations, the one or more operations may match operations that are indicated by the user to be performed upon the occurrence of a trigger condition. The UIA may initiate operations that the user previously initiated in similar conditions in the past, even though the user did not specify for those actions to be repeated. For example, the UIA or an associated server system determines that a user has a pattern of accessing a garage access credential when approaching a particular garage. When proximity to the garage is detected again, the UIA may automatically bring up an interface allowing the user to apply that same credential, or the UIA may automatically apply the credential to open a door to the garage.

For example, in some implementations, the UAI may determine, based on the user history, that the user device communicates user identity information and credential information to a server of the user's employer to access a facility of the employer after detecting that a place of employment or enterprise is within a threshold distance and obtaining a credential associated with the place of employment. Accordingly, the user device may communicate user identity information and credential information to a server of the user's employer to access a facility of the employer each time the user device detects that a place of employment or enterprise is within a threshold distance.

In another example, after identifying a media file, media type, radio station, or playlist that the user typically listens to on the user's commute to work, the user device may output or control another device (e.g., speaker) to output the identified media. In another example, after obtaining financial data and biographical information, the user device may display an indicator of the age of the user and may communicate portions of the financial data to a payment server of the bar. In general, various operations may be executed based on the trigger condition and data retrieved from the user identity profile. FIGS. 2-8 illustrate other examples of operations executed based on trigger conditions and data retrieved from the user identity profile.

In some implementations, the user device may be configured to automatically execute the operations after retrieving data from the user identity profile. In some implementations, the user device may display a message through a GUI of the UIA to request an approval or selection from the user indicating that the user would like the user device to execute an operation that the user device has determined to be performed based on the data retrieved from the user identity profile.

Upon execution of one or more operations (916), the UIA may update the user identity profile to include data indicative of the executed one or more operations and the condition that triggered the execution of the one or more operations so that the user identity profile remains dynamic and is updated in real time (918).

Figure 9:
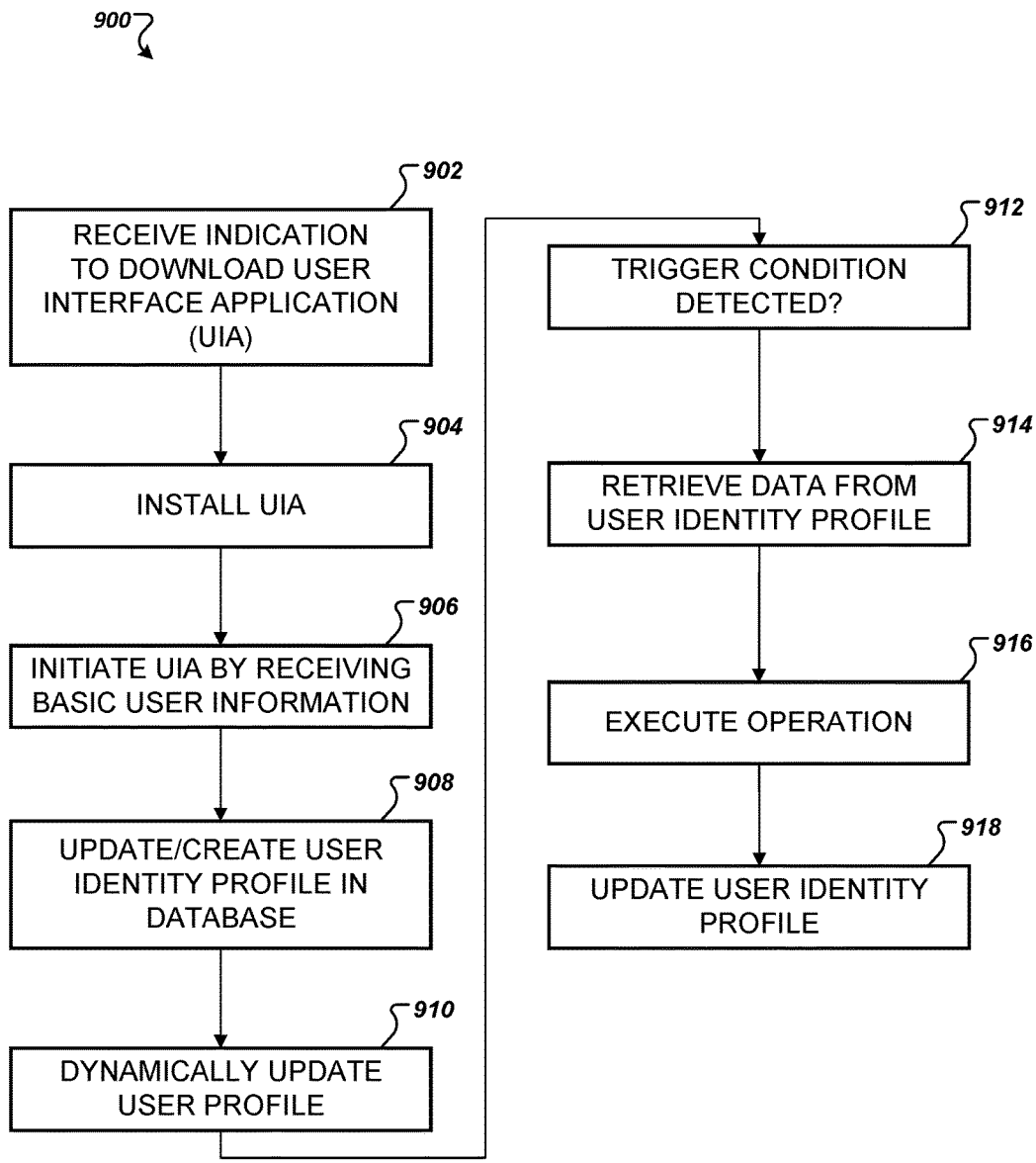
FIG. 9 depicts a method for providing dynamic identity profiles.

An exemplary scenario illustrating the execution of the method depicted in FIG. 9 is described below.

After a UIA is installed on a user device and a user identity profile is created by receiving biographical data associated with the user, the user identity profile may be dynamically updated by obtaining data indicating that the user possesses a credential provided by a particular credential issuer, such as an employer of the user. The user identity profile may be further updated with credential data, such as a badge indicative of the credential. Next a trigger condition may be detected. The trigger condition may be receipt of an activation input to activate the badge indicative of the credential. The activation input may include one or more of a beacon signal, a user input, an indication of a location. In response to detecting the trigger condition, the user device may obtain contextual information associated with the activation input and the credential. The contextual information may include one or more of location information, biometric information, motion information, analytics information, time information, third party information, optical data, workflow type, transaction type, employer type, occupation type.

After obtaining contextual information associated with the activation input and the credential, the user device may execute one or more operations. For example, the user device may display the badge indicative of the credential. In some cases, the badge may be customized based on the contextual information. The user device may also receive a second input through the displayed badge, control execution of a function in response to the received second input, and update a display of the badge to reflect execution of the function. After executing the one or more operations, the user identity profile may be updated according to the credential, trigger condition, the first input, the contextual information, the second input, and the executed function.

As described in the implementations and figures described above, a dynamic user identity is maintained and updated by monitoring user interactions. The user identity application may track one or more interactions of the user and use the information extracted from these interactions to update the user's dynamic identity. For instance, if the user visited a restaurant, such as Joe's Bar described above, for the first time, the user identity application may store information indicating the applications used by the user while at the restaurant, and upon a subsequent visit to the restaurant, automatically open or provide access to the same applications for the user to use. The user identity application may be employed in various manners and may provide an improved experience that is customized for the user.

It should also be understood that operations performed by the user identity application may depend on the context information received or determined by the user identity application, or context information receive by an associated server system. For example, if the user identity application determines that a user of the user identity application is near a building and is driving, the user identity application may activate a display of a key to a garage of the building. If the user identity application determines that a user of the user identity application is near a building but is walking, the user identity application may activate a display of a key to a lobby of the building. If the user identity application determines that a user of the user identity application is near a building, is walking, but is returning to the building late at night (e.g., 2 AM), the user identity application may activate a display of a key to the building's lobby on an interface that permits the user to unlock the door to the lobby. Due to the late hour, the application may also request a verification code that can be entered through the user identity application to ensure that the building's security is not compromised.

An identity can be constructed using a variety of types of data. The identity may be dynamic in the sense that it may change and be updated to reflect actions and behaviors of the user. For example, basic information (such as name, etc.), location information, financial information, commercial information, biometric information, medical or health information, social information, and behavioral information can all be used in forming an identify for a user. An identity can be derived from any combination of user data, including a time element that may indicate, for example, when particular events or changes occurred. In some implementations, the user may see, control and approve access to the user's information and the level of information requested. Data can be maintained up-to-date as part of the user's profile or identity. Information can be on-demand, as needed, not permanently in another database. A user may be able to see a history of permissions granted and the data viewed by others. The information in the identity profile may be used for form-filling, experience-specific profiles, or sharing information with others.

The identity profile may indicate a user's likes or dislikes (which may be explicitly indicated or inferred), preferences, habits, behaviors, memories, paths (e.g., routes driven or walked), and so on. Intrinsic traits of the user can be linked with physical traits and measureable actions, as well as extrinsic traits of the user, such as memberships, relationships, ownership, movement, presence, and actions.

Figure 10:
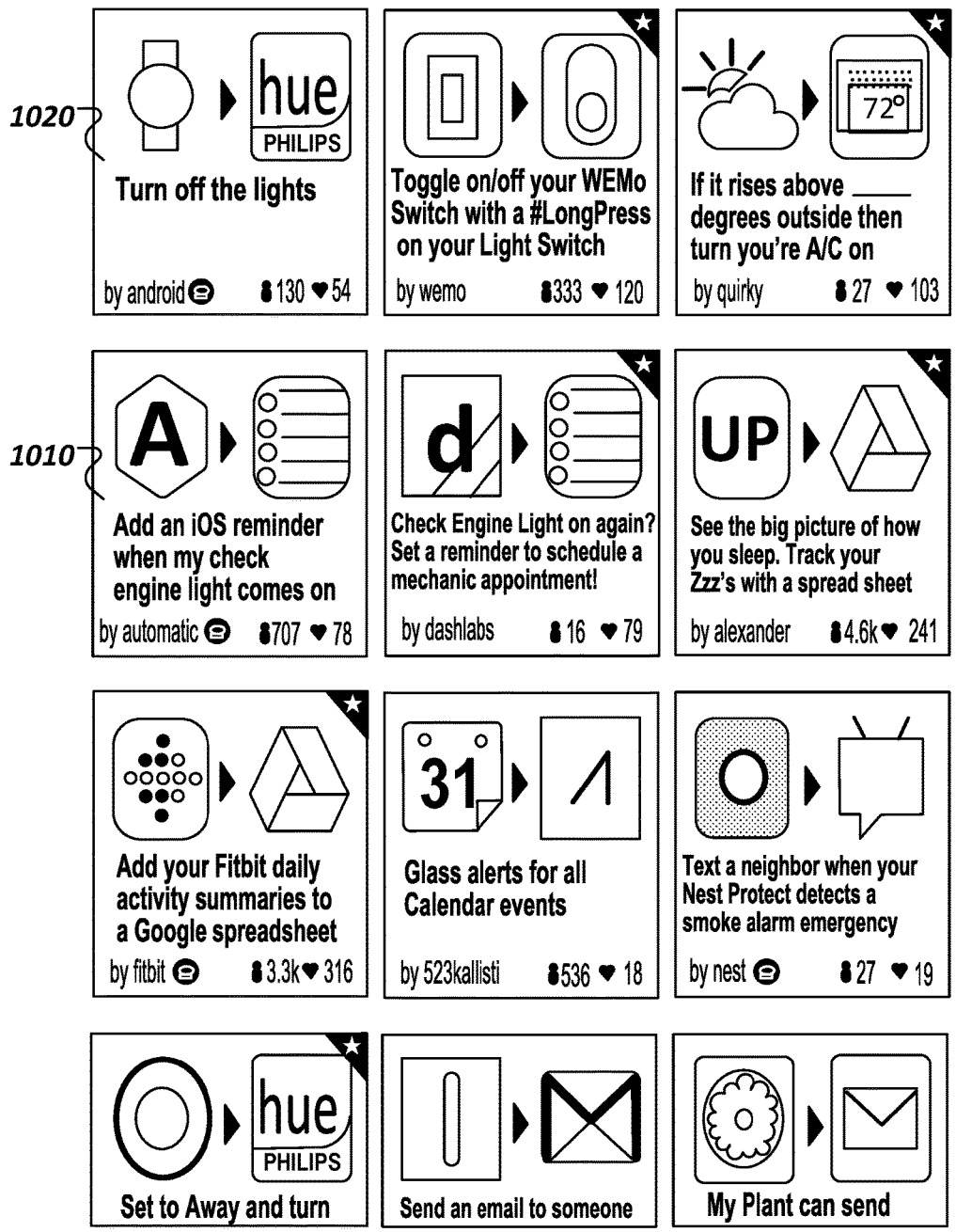
FIG. 10 illustrates examples of conditions and associated actions.

Information in profiles may be used to trigger various actions that are appropriate to the situation of a user. If a particular action occurs, an associated action is triggered. If a user has not set an action to perform, an application on the user's phone or other device may detect a condition and suggest an action or a rule to cause an action automatically if the condition is encountered again. For example, FIG. 10 shows examples of conditions or situations that may be detected, in part or in whole, based on a user's dynamic identity profile and associated actions that may be taken. A system may include predetermined rules or templates that define conditions to detect and corresponding actions to perform if the conditions occur. For example, as shown in FIG. 10, when it is detected that a "check engine" light comes on in a user's car, a reminder may be automatically added to calendar or set of device notifications (1010). As another example, if lights are left on after a particular time or when no one is present, the lights may be turned off automatically (1020).

Dynamic identity profiles may be used with a variety of other technologies. Examples include iBeacons, iOS Frameworks, Connection protocols, thin-film sensors, wearable technology (e.g., Android Wear, Fitbits, Samsung, iWatch), non-app device tracking (WiFi, BT, GPS, etc.), payment systems, other beacons, and other operating systems and platforms. These technologies can provide the data to a user's profile, and/or may provide a channel in which actions can be taken in response to detecting particular attributes in a profile.

Dynamic identity profiles can be used in a variety of industries, for example, hospitality, office work, tradeshows, finance, education, and security. Similarly, the principles are applicable to a variety of scenarios, including dynamic identity, combining peer-to-peer interactions and payments, providing location- and identity-specific notes/content, determining presence/attendance/roll call (e.g., using Bluetooth, beacons, wearable devices, etc.), combining presence data with actions (e.g., turn off lights, or push notification, in response to detected presence), and navigation (e.g., transitioning between indoor and outdoor navigation techniques).

Other uses may be driven by analytics. Users may be able to view networked devices (e.g., "Lab of Things" devices or interconnected home devices) and see statistics. A user may be able to access a comprehensive view of his or her own identity and behavior. The system may identify which devices or applications near the user are receiving what information, as well as when, history, and control if possible. Indoor floor plan tools and templates around interconnected devices may permit users to perform additional analysis.

The features of a credential management system may be extended using dynamic identity profiles also. For example, a credential management application or system may include messaging over BlueTooth, ability to view permissions for each badge or credential along with associated settings, ability to embed analytics within the credential management interface, the ability to share permissions among users (e.g., badges, keys tickets, etc., e.g., first user transfers or extends permission pick up first user's package from post office, kids from school, etc., to a second user), and the ability to integrate with TouchId, Passbook and other iOS framework integrations.

Other features are possible, such as on-the-fly badges, e.g., credentials that a user may create and extend to others, and which may be temporary in duration. Dynamic identities can be integrated with selective sharing, so that users receive information or not depending on their changing identity profiles. Identity information can be broadcast, and the broadcast may be triggered by a beacon (e.g., a beacon indicating a check in at a doctor's office, a restaurant, etc.).

Various examples of the use of dynamic identities include potential uses in the home.

- Auto-shut-off lights/fans/devices when it is detected that no one is home.
- The system can locate lost clothing, wearables, phone in the house.
- Child pushes a single-purpose button to indicate they are home.
- Schedule a button to flash daily when it's time for your child to take their medicine or vitamin. The child can push the button to notify the parent when they do.
- User opens fridge door, can't find milk, asks fridge "Find milk" in a spoken command. The fridge locates the item and says "Bottom shelf, far back."
- User asks the fridge "Are we out of milk?" (without even opening the door), and the fridge says "There is no milk carton in here."
- User asks fridge "Are we out of anything in my grocery list?" and fridge posts results on the door's screen.
- Perishable item notifies fridge it is near/past expiration date; fridge posts warning on the door's screen.
- Kitchen warns user of an abandoned stove/oven, notifies of a pending auto-shut-off.
- Unlock computers, devices, connected widgets when it is detected that the user is nearby, no need to input passwords all the time.
- For TV's, a set of favorite channels can be dynamically set based on identity. Content restriction can be applied based on identity (parental control applied when the child is detected nearby, or at certain times).
- Lights/appliances/HVAC responsive to presence/forecasts, remote control, follow you around (e.g. music from room to room) different music, knows who you are
- Environmental sensors—moisture, temp, number of people
- Security, entry
- Automatic guest lists can be created based on behavior patterns. Permissions to enter an event or location can be automatically granted
- Maintenance schedules—e.g., air filter tracking provides a prompts when it's time to change the filter (e.g., by schedule or by sensing end of life)
- System can remind or detect when plants have been watered or need to be watered, by sensor or schedule
- An alert for cleaning can be provided, for example, using a dust sensor, or tracking a time since last vacuum
- Environment adjusts to a user's mood/physical state—TV may recommends content customized for an estimated mood based on activities or events tracked in the dynamic identity profile
- Decibel sensor—adjust music for party vs. dinner gathering based on the activities and people detected
- Schedule friends' visits—system can indicate their favorite foods, etc. to the host to obtain in advance
- Health/sleep sensors can provide information to a doctor, or remind or track an exercise plan, recommend yoga Other uses of the system can occur for a vehicle:
- The system can connect with a car's computer to monitor status of systems (tires, battery, fluids, brakes) & maintenance schedule.
- The system can enable auto-unlocking of the car for certified drivers.
- Auto-adjust seat, mirrors, a/c, radio/playlist & volume to suit the driver's personal preferences, which can be inferred from the settings detected during prior use of by the user.
- Choose from an audio or visual list of frequent routes by name ("Work", "School", "Trader Joe's"), to get directions & traffic. Each set of routes can be specific to the driving habits of an individual user, as tracked in the dynamic identity profile.
- System can connect with personal calendar to provide reminders as you start up the car ("Reminder: Your child's science project is due today.")
- System can warn driver of missing items when the car starts moving ("Warning: Your child's lunchbox is not in the car.", or "Warning: Your wallet/cell phone is not in the car.")
- Car connects with HealthKit data, determines that you have not slept much, and enables audible warnings while driving (e.g., "Warning: light change up ahead.", or "You are driving 15 miles over the speed limit" or even "Caution!" when the car ahead of you stops suddenly.)
- Identity-based insurance information exchange, e.g., in the event of a car accident, information from two different profiles may be exchanged between drivers and/or the insurance companies that the drivers desingate.

Other uses are applicable to an office setting:
- Publish conference room usage/Show live occupancy/roll call to attendees
- Selectively share identity, presentations & calendar in meetings—tie in with outlook calendar for permissions of who receives what information
- Integrate presence with Outlook/Lync, find where people are when you want to meet them
- Publish (anonymous) bathroom availability.
- Put beacon on bathroom cleaning cart to detect unavailability during cleaning
- Publish parking space availability to help drivers know where available spots are and how many there are, in real time.
- Profile of people you haven't met before/as you walk by
- Trigger notifications of others who have common interests Track last interactions with someone based on outlook and ping accordingly Find people to eat with based on who's going to lunch now combined with interests captured in the dynamic identity profile Free food indicator can notify employees when and where food is available Information and documents can be shared across devices when both are Start an email on phone and pick up on laptop and vice versa Workout/walk/drink reminders can be provided Supply refill reminders and tracking. E.g., can indicate when toner in copier is running low, which machine, what part needs to be ordered, and where the machine is physically located in the building The system can estimate the stress levels of people based on their recent interactions and schedule information. Can notify others that it may not be a good time to stop by to talk.

HomeKit integration with lights, etc. can turn on, turn off, or apply personal preferences when a particular person is detected nearby.

Auto turn off of TVs when no one is using them or no one is in room

A user can see one's own statistics about time and activities in office

Various businesses can benefit from the information in dynamic information profiles:

Retail/Grocery stores: Advertising systems or kiosks can respond to the wish lists of the individual customer who is standing nearby, if the customer has elected to share or make the list public.

Restaurants: System can auto-notify restaurant as you approach. System can auto-notify customer of wait times & menu options.

Restaurants & airports deploy context-dependent buttons to call for a taxi to a specific location.

Restaurants—can allow auto-check in for reservations, e.g., by arriving at the parking lot or stepping into the building, the customer can be detected as present. Distribute a group badge for number in a party, and inform them or the restaurant when everyone is there. Similarly, can inform those who are waiting for someone who is missing, where they are, and give option to contact them.

Package delivery. When confidential, important, or high-value packages require proof of identity, the recipient could define a surrogate recipient by granting rights to another user, e.g., by designating that user's user identity. RFID could be used for package identification and tracking. The confirmation of the RFID and the confirmed user identity at the same location may be used as proof of delivery.

Travelers can also benefit from dynamic identity profiles:

System can inform a user, based on current gate assignments and the user's specific itinerary, which airport entrance to use and how to best navigate through terminal Flight status notices can be provided Easily check in, check bags, go through security Know how long security lines are taking No more seat mix-ups—a TV at the seat or an app on the user's phone can say "you're in wrong seat, go to 23E"

Can help passengers get to know travelers around you and easily exchange info, notify you of others with shared interests, or notify users of someone that they know nearby Order food/drinks, movies, etc. via phone. User could place orders in advance, or have a standing order for each flight based on user's preferences.

Administration of travel may also be facilitated:

Detection of passengers allows workers to easily count open/empty seats, and determine who is not present System can provide a real-time/actual passenger manifest Identify doctors on board (if the doctor allows). May discount for doctors to fly on a particular flight if no doctor is on the flight already Know where fliers are during connections—e.g. Passenger John D. is currently at gate X Manage security line flows based on average times, which can be tracked by the movement of each individual's device through the process TSA can easily flag/identify persons of interest, store travel history, etc.

Security on plane can be enhanced by tracking passenger locations within the plane—e.g., can detect when a person is close to cockpit, amount of time in bathroom, etc.

Analyze traveler flow through airport/station. Detect irregularities, bottlenecks, and other traffic patterns that may indicate a problem and notify appropriate teams.

Group tours, automatic member count using identity broadcasting, broadcast messages to tour members (e.g. meeting point and time).

In a school setting, students can benefit:

Students can be informed of the other students nearby

System can help students find study groups based on profiles, or responses to specific lecture areas (e.g., identify students that each found a specific part to be confusing, or that took extra time on a particular page or task, and recommend study groups with people they know or that study nearby)

Students can evaluate a professor live—like sentiment polling during presidential debates Students can submit questions to the lecturer during a presentation Device sharing, identity based access. Students could share computers and devices, content will be tailored based on identity. Students identity confirmed for digital exams taken on shared devices.

Other uses include school administration:

Take attendance automatically

Easily identify students when calling on them—integrate with HomeKit to have light shine on student Assess student understanding live during lecture See student profile, history, performance, etc.

Create groups based on desired student mix

Distribute assignments, grades, exams, etc.

Various recreational facilities or activities (e.g., Amusement Park, Museum, Stadium, Casino, etc.). For attendees of recreational facilities:

Easy ticketing, tied to the person's dynamic identity profile so no physical ticket may be needed System can assist with navigation through park based on desired plan, where seats, bathrooms, concessions, etc. are Indication of queue times System can provide location-based reminders of bathrooms, Mickey Mouse photo ops, etc.

System can provide location-based deals, points of interests—e.g. food, shops, must-sees System can provide roller coaster photos (view/order/deliver via phone)

Integration with attractions (e.g. light parade reacting to users approaching, or information specific to those users)

System can track members in a family or party

Information on individual sights, pieces, entire collections, etc.

System can allow users to "bookmark" a location, activity, or attraction for later—combine with gift shop ideas Recommendations can be provided—"if you like Monet, try Cezanne . . . "

Summary of visit can be provided—can link personal photos with info, e.g. scrapbook Suggestions where to park, which entry gate based on tickets purchased System can display wait times for bathroom queues, concessions, etc.

system can provide profiles/winning history of certain games/tables; can indicate history or success rates of others at the table Notices can be provided as to what pot/stakes are at certain tables to help users decide whether to join Track how much a user has bet (with sensors/weights on/of chips)

For administrators of recreational facilities:

System can automatically control/recommend traffic flow via notices

Analyze popularity of attractions, items, exhibits, game, table

Manage/Analyze visitor behavior, flow

Shopping/preference history

Manage ticketing, special exhibits, validation, deals

Recommend additional attractions, different games, tables, events, etc.

Post-trip communications—e.g. trip record, suggestions for next trip, solicit donations/membership Offer concessions at seats, vendors know which seat Analyze general gambler trends, behavior, flow, spend, etc.

Dealer knows who's at table, sees summary of bets

Record specific preferences—e.g. drinks, betting history, etc.

In a retail setting, shoppers may have various uses for the system:

Navigation—system can link a particular user's shopping list with the floor plan of the store, to provide an efficient path to get each item of the list Reminders can be provided based on the user's past shopping history (e.g. "got milk and eggs?")

Recipe/pairing ideas can be provided as the user walks by certain ingredients based on past consumption, or by other items obtained this visit System can allow for checkout as the user shops Coupons issued to a user can be associated with the identity profile and can be applied automatically at checkout Other uses facilitate the administration of retail stores:

System can push special deals as visitors pass, customized according to their preferences, behaviors, and purchase histories System can monitor and address long lines at checkout System can indicate where employees are System can analyze behavior in addition to just purchases—e.g., detecting and analyzing customers pausing by displayed deals, flow through store (direct v. browse), time spent comparing items, etc.

Post-trip communications—e.g. reminders of when milk might be low

Tradeshow or conference attendee may benefit from the system:

Navigation/notices can be sent based on desired visits, schedule, past meetings

Easy exchange of contact information when meeting others, since the system can record who you spoke with (e.g., or were near for a particular action or amount of time); can let users add notes for contacts or specific interactions Notification can be provided when certain contacts or things of interest are close by Quick information about booths can be provided as attendees approach History/record of visits can be stored for attendees and presenters to view A tradeshow or conference administrator may use the system for a variety of reasons:

The identity profile, and detection of a person through a phone or other device, may eliminate need to scan badge bar codes Record specifically which visitors visited which areas; can allow workers to take notes Track general visits, duration, staff performance Track popularity of certain sections/products Post-trip analysis: slice and dice information about the visitors Hospital or medical patients can also use the system:

Proof of identity with a phone or other device can allow for easy check-in for appointment, or admission—no more signing in necessary Patients may choose what part of medical history to share; no more forms needed to repetitively enter information, as it can be obtained through the identity profile when the user grants access Record of visit, info, etc.

Can provide estimated wait times when the patient arrives or is considering going to the doctor Other uses are applicable to hospital or medical administration:

System can identify who's in waiting room, whether patients are ready or late for appointments Notices can be provided based on schedule/patient readiness As approach exam room, workers can see patient information System can monitor patient waiting times and doctor treatment times per procedure Estimated treatment times can be calculated Other uses include:

Augmented reality, content access based on predefined networks. Users could leave notes, comments, suggestions for specific locations (restaurants, movie, stores, etc.). The access to this information could be restricted to certain individuals, networks or open to the public. This information may only be visible within proximity of the defined location.

Identity broadcast can automatically fill-out forms, including web forms (QR Code), doctors, DMV, customs, hotels, new account registration, etc. As an added feature, in certain cases, make user in control of information, user's info is never sent to requestor, it's accessed by reference, granted permission by user, which can be revoked at any time.

Identity based "amber alerts", parents broadcasts to a public network lost/missing child identity (basic info, photo, first name, etc.). More than amber alert, this could be useful for lost children within public places with large crowds, the alert could be broadcasted to other network members in proximity of a certain location (store, hotel, amusement park, stadium, etc.)

Passbook Integration—have badges, esp. temporary ones easily accessible via Passbook Emergency contact info (ICE)—for police, for friends (e.g., I want to call my friend's mom, but I don't have her number)

Wearables can provide status indicators in conjunction with a credential management system—e.g., verifying person is of drinking age—can be issued for a specific event.

In general, in each of the scenarios discussed above, a user device may receive communications (e.g., via Bluetooth or other communication protocol) from nearby devices to determine the presence, proximity, and status of the other devices. This information, combined with user input such as queries, user interface selections, or current tasks in progress can indicate a context. That context may be compared, by an application on the user device or a server system in communication with the user device, with information in a user identity profile to determine whether the context matches or is within a threshold level of similarity of prior user behavior or the conditions for a customized trigger for the user. Similarly, the application or server system may compare the context information with other rules or scenarios that have corresponding actions. Additionally, information from many different device may be aggregated to be able to make determinations about groups of users or devices.

In some implementations, a framework for using dynamic user identity information uses input from a variety of sources to enhance a user's experience. The framework can observe the context surrounding a user, provide information to appropriate devices, and act based on rules or statements that are applicable to the observed context. One component of the system may run on a client device and detect contextual information and monitor changes. This information can be provided to a server system that stores and updates an identity profile for the user. The server may obtain a variety of types of information from may different devices, including proximity and location information, time, motion, analytics, biometrics, and other information. Different parties may define particular contexts as combinations of detected parameters. Each defined context may have an associated statement of an action to be taken.

For example, if it is determined that a user is near a building and is driving, and the user is has the appropriate credential to access the building, a garage key can be displayed to the user or the garage can be opened for the user automatically. As another example, if it is determined that the user is near a building and is walking, and the user has the credential to access the building, a key for the lobby of the building may be displayed or the lobby may be unlocked. In either scenario, if circumstances deviate from a set of typical conditions, e.g., presence is detected outside of work hours, additional verification or authentication may be required.

As another example, if a user receives a location beacon in a store, the user identity profile indicates that the user has never used a particular service that is available, and the user is stationary, the system may provide a push notification giving instructions or advertisement of the service. As another example, if a user is on a university campus and the system detects that the user has not been to the campus before, the system may provide an interface that allows the user to obtain a credential, badge, or application for the university.

Various other actions can be taken. Notifications of a user's available keys or credentials can be triggered by proximity of a user to beacons. The notification may include a control permitting the user to apply the key through the notification interface. User interaction with the notification interface can provide a transmission to the beacon system that can indicate the user's desire to apply the key and open the door.

The information from a dynamic user identity profile may be limited and may be provided to third parties or other users of the system only according to the current context. For example, in a grocery store, the store may be provided information about a user's food and grocery store purchase histories, but not information about any other purchases. The user's device, and/or an associated server system, may determine the particular context the user is in based on a variety of factors and sources of data.

In addition to a user providing information associated with the user's dynamic identity profile, the user's dynamic identity profile may also be modified or updated based on information received from a third party. For example, data received from a user's connection (e.g., friend) in a social network (e.g., Facebook, Instagram etc.) may be used to configure the user's identify profile. This data may include, for example, common interests, events attended, or places visited by the user and the user's connection.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 11:
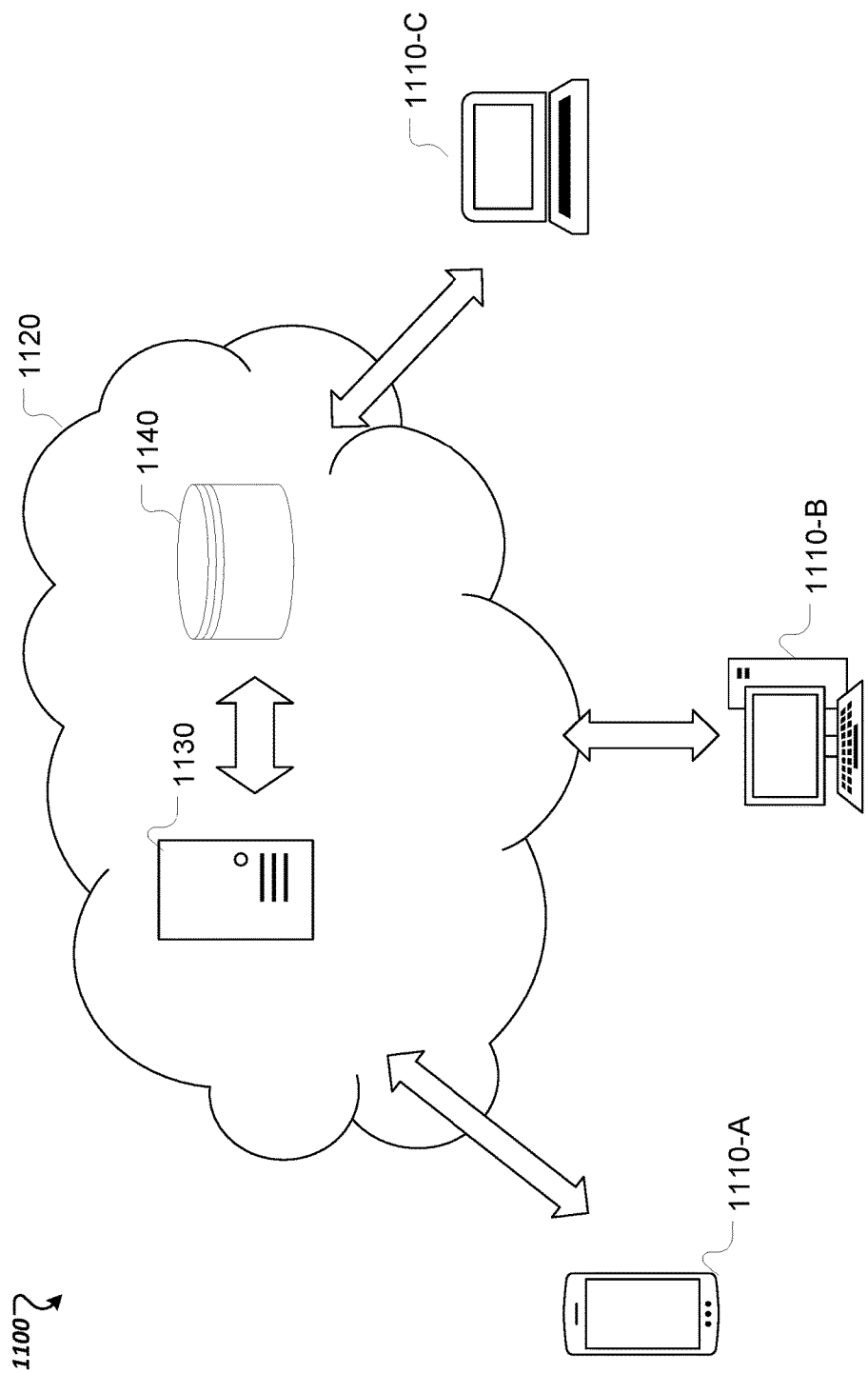
FIG. 11 illustrates a system that provides dynamic identity profiles.

Embodiments of the subject matter described in this specification can be implemented in a system as described above and illustrated in FIG. 11. The system 1100 may include one or more user devices 1110-A, 1110-B, 1110-C, one or more networks 1120, one or more servers 1130, and one or more databases 1140, as described above. For example, each of the user devices 1110-A, 1110-B, 1110-C may include, for example, a smart phone, a television, a wearable electronic device (e.g., smart watch), smart glasses (e.g., Google® glasses), a laptop, and, in general, any electronic device capable of connecting to one or more networks 1120 and installing the UIA. The user devices 1110-A, 1110-B, 1110-C may have a GUI or a Web browser through which a user can interact with the UIA and other implementations of the subject matter described in this specification.

The one or more networks 1120 may provide network access, data transport, and other services associated with the one or more networks 1120. The one or more networks 1120 may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks 1120 may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks 1120 may implement a WiMAX architecture defined by the WiMAX forum or a Wireless Fidelity (WiFi) architecture. The one or more networks 1120 may include, for instance, a local area network (LAN), a wide area network (WAN), the Internet, a virtual LAN (VLAN), an enterprise LAN, a layer 3 virtual private network (VPN), an enterprise IP network, or any combination thereof. Communications between the user device 1110-A, 1110-B, or 1110-C, other devices, one or more servers 1130, one or more databases 1140, or one or more network elements may be performed through the one or more networks 1120, which may include, for example, the Internet, the cloud, and peer-to-peer networks (e.g., ad hoc peer-to-peer networks).

The one or more networks 1120 may include one or more databases 1140, access points, servers 1130, storage systems, cloud systems, and modules. For instance, the one or more servers 1130 may include the identity management server, which may include any suitable computing device coupled to the one or more networks 1120, including but not limited to a personal computer, a server computer, a series of server computers, a mini computer, and a mainframe computer, or combinations thereof. The identity management server may be used for and/or may provide cloud and/or network computing and user identity profile services as described above. The one or more servers 1130 may also include a back end component, e.g., as a data server, or a middleware component, e.g., an application server.

The system 1100 can include clients and servers 1130. A client and server 1130 may generally be remote from each other and typically interact through network 1120. The relationship of client and server 1130 arises by virtue of computer programs running on the respective computers and having a client-server relationship to each other. In some implementations as described above, the one or more servers 1130 may transmit data (e.g., an HTML page) to a user device 1110-A, 1110-B, or 1110-C, for example, for displaying data to and receiving user input from a user interacting with the user device 1110-A, 1110-B, or 1110-C.

The one or more databases 1140 may be any include any suitable type of database, including a cloud database, an enterprise database, a credential issuing or verifying database, a user identity profile storage database, or a database managed by a database management system (DBMS). A DBMS may be implemented as an engine that controls organization, storage, management, and retrieval of data in a database. DBMSs frequently provide the ability to query, backup and replicate, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

In some implementations, the one or more databases 1140 store user identity profiles provide and collect user identity profile data to and from user devices 1110-A, 1110-B, 1110-C through the one or more servers 1130. Data may be sent and received using any technique for sending and receiving information between processes or devices including, but not limited to, using a scripting language, a remote procedure call, an email, an application programming interface (API), Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof.

The system 1100 can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The system 1100 may include other devices and interactions also. For example, user devices may communicate their presence and status to each other. Similarly, a number of other devices, such as electronic door locks, televisions, connected appliances, location beacons, and so on can communicate with each other and with the devices in the system 1100, ultimately providing information that used to generate and update user identity profiles as well as determine a current context that can trigger various operations by the components of the system 1100.

While this specification contains many specific implementation details, these should not be construed as limitations on the scope of any innovations or of what may be claimed, but rather as descriptions of features specific to particular embodiments of particular innovations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   accessing, by one or more processors in a user device, a user identity profile for a user, the user identity profile including (I) a badge indicative of a credential issued to the user by a credential issuer, and (II) a location to output the badge on the user device associated with the user;
   updating, by the one or more processors, the user identity profile based on one or more interactions of the user, the one or more interactions indicating one or more of an activity of the user, an interest of the user, and an interaction with an electronic system or device;
   determining, by the one or more processors, that a trigger condition has occurred based on a current location of the user device being within a threshold distance of the location to output the badge;
   in response to determining that the trigger condition has occurred, identifying, by the one or more processors, one or more operations previously executed by the user device that are indicated by data included in the user identity profile and one or more user preferences of the user, the one or more operations comprising outputting the badge indicative of the credential by the user device; and
   controlling, by the one or more processors, execution of the one or more operations by the user device according to the one or more user preferences.

2. The computer-implemented method of claim 1, wherein accessing the user identity profile for the user comprises:
- determining whether the user identity profile is stored in an identity management database;
- generating the user identity profile in response to determining that the user identity profile is not stored in the identity management database; and
- providing data identifying the user device to the user identity profile in response to determining that the user identity profile is stored in the identity management database.

3. The computer-implemented method of claim 1, wherein updating the user identity profile based on one or more interactions of the user comprises updating one or more of basic user information, biometric information, medical information, health information, social information, behavioral information, commercial information, financial information, contextual information, and location information in the user identity profile.

4. The computer-implemented method of claim 1, wherein updating the user identity profile based on one or more interactions of the user comprises one or more of:
- receiving a user input to configure one or more of the credential and the trigger condition;
- receiving contextual information for executing an operation;
- receiving an indication that an operation has been selected by the user for execution upon occurrence of the trigger condition; and
- receiving an indication that an operation has been selected for execution by the user device without user input upon occurrence of the trigger condition.

5. The computer-implemented method of claim 1, wherein determining that the trigger condition has occurred further comprises determining that the trigger condition has occurred based on one or more of calendar information, contextual information, user behavior, user interest, and user input.

6. The computer-implemented method of claim 1, wherein identifying the one or more operations previously executed by the user device that are indicated by data included in the user identify profile and the one or more user preferences of the user comprises one or more of:
- accessing user history data;
- determining operations that were previously executed by the user device upon the occurrence of the trigger condition; and
- determining the one or more user preferences upon the occurrence of the trigger condition.

7. The computer-implemented method of claim 1, wherein:
- determining that the trigger condition has occurred further comprises receiving one or more of a beacon signal or a user input; and
- identifying the one or more operations previously executed by the user device that are indicated by data included in the user identify profile and the one or more user preferences of the user comprises:
  - obtaining contextual information that includes one or more of biometric information, credential information, motion information, analytics information, time information, third party information, optical data, transaction type, employer type, and access level type; or
  - obtaining data indicative of one or more operations performed in response to receiving the one or more of the beacon signal, the user input, or the indication of the location to output the badge indicative of the credential.

8. The computer-implemented method of claim 7, wherein controlling the execution of the one or more operations by the user device comprises:
- controlling the user device to display the badge, the badge being customized based on the contextual information;
- receiving a second input through the displayed badge;
- controlling execution of a function in response to the received second input;
- updating a display of the badge to reflect execution of the function; and
- updating the user profile based on one or more of the credential, the contextual information, the second input, and the executed function.

9. The computer-implemented method of claim 8, wherein controlling the user device to display the badge, the badge being customized based on the contextual information comprises:
- transmitting a message to a server associated with the credential issuer, the message including credential information identifying the credential, identification information of the user device, location information of the user device, and user identification information;
- receiving a validation message from the server associated with the credential issuer, the validation message indicating that the credential has been validated and including data for customizing the badge with the location information of the user device; and
- displaying the customized badge.

10. The computer-implemented method of claim 1, wherein:
- the location to output the badge is based on one or more of user history, user preference, and contextual information; and
- the location to output the badge includes one or more of a place visited by the user more than a threshold number of times, a place indicated by the user as being of interest, and a place determined to be of interest based on contextual information.

11. The computer-implemented method of claim 10, further comprising:
- in response to determining that the trigger condition has occurred, performing one or more of:
- obtaining biographical data including user identification data and age verification data that verifies an age of the user;
- obtaining financial data for providing one or more payments; and
- obtaining the one or more user preferences for responding to the trigger condition, the user preferences including a customized setting or a privacy setting.

12. The computer-implemented method of claim 10, wherein controlling the execution of one or more operations by the user device according to the one or more user preferences comprises one or more of:
- controlling the user device to output the age verification data such that the age verification data is output without outputting the age of the user based on the obtained user preferences;
- transmitting payment information to a server associated with an entity at the location to output the badge based on the financial data;
- transmitting the credential and user identification data to access the location to output the badge; and wirelessly communicating with another user device located at the location to output the badge based on the customized setting or the privacy setting, wherein the wireless communication includes transmitting the user identification data to the other user device.

13. The computer-implemented method of claim 1, wherein:
the one or more user preferences include a preference to execute the one or more operations without receiving a user input and without the one or more processors generating a query that requests the user to confirm execution of the one or more operations; and
controlling the execution of the one or more operations by the user device according to the one or more user preferences comprises:
controlling the execution of the one or more operations by the user device without receiving a user input after the trigger condition has occurred.

14. One or more non-transitory computer-readable storage media storing instructions executable by one or more computers in a user device which, upon such execution, cause the one or more computers to perform operations comprising:
accessing a user identity profile for a user, the user identity profile including (I) a badge indicative of a credential issued to the user by a credential issuer, and (II) a location to output the badge on the user device associated with the user;
updating the user identity profile based on one or more interactions of the user, the one or more interactions indicating one or more of an activity of the user, an interest of the user, and an interaction with an electronic system or device;
determining that a trigger condition has occurred based on a current location of the user device being within a threshold distance of the location to output the badge;
in response to determining that the trigger condition has occurred, identifying one or more operations previously executed by the user device that are indicated by data included in the user identity profile and one or more user preferences of the user, the one or more operations comprising outputting the badge indicative of the credential by the user device; and
controlling execution of the one or more operations by the user device according to the one or more user preferences.

15. The one or more non-transitory computer-readable storage media of claim 14, wherein: accessing the user identity profile for the user comprises:
determining whether the user identity profile is stored in an identity management database;
generating the user identity profile in response to determining that the user identity profile is not stored in the identity management database; and
providing data identifying the user device to the user identity profile in response to determining that the user identity profile is stored in the identity management database, and
updating the user identity profile based on one or more interactions of the user comprises one or more of:
updating one or more of basic user information, biometric information, medical information, health information, social information, behavioral information, commercial information, financial information, contextual information, and location information in the user identity profile;
receiving a user input to configure one or more of the credential and the trigger condition;
receiving contextual information for executing an operation;
receiving an indication that an operation has been selected by the user for execution upon occurrence of the trigger condition; and
receiving an indication that an operation has been selected for execution by the user device without user input upon occurrence of the trigger condition.

16. The one or more non-transitory computer-readable storage media of claim 14, wherein:
determining that the trigger condition has occurred comprises receiving one or more of a beacon signal or a user input,
identifying the one or more operations previously executed by the user device that are indicated by data included in the user identify profile and the one or more user preferences of the user comprises:
obtaining contextual information that includes one or more of biometric information, credential information, motion information, analytics information, time information, third party information, optical data, transaction type, employer type, and access level type; or
obtaining data indicative of one or more operations performed in response to receiving the one or more of the beacon signal, the user input, or the indication of the location to output the badge indicative of the credential, and
controlling the execution of the one or more operations by the user device comprises:
controlling the user device to display the badge, the badge being customized based on the contextual information;
receiving a second input through the displayed badge;
controlling execution of a function in response to the received second input;
updating a display of the badge to reflect execution of the function; and
updating the user profile based on one or more of the credential, the contextual information, the second input, and the executed function.

17. A system comprising:
one or more computers and one or more storage devices storing instructions that upon execution by the one or more computers in a user device, cause the one or more computers to perform operations comprising:
accessing a user identity profile for a user, the user identity profile including (I) a badge indicative of a credential issued to the user by a credential issuer, and (II) a location to output the badge on the user device associated with the user;
updating the user identity profile based on one or more interactions of the user, the one or more interactions indicating one or more of an activity of the user, an interest of the user, and an interaction with an electronic system or device,
determining that a trigger condition has occurred based on a current location of the user device being within a threshold distance of the location to output the badge;
in response to determining that the trigger condition has occurred, identifying one or more operations previously executed by the user device that are indicated by data included in the user identity profile and one or more user preferences of the user, the one or more operations comprising outputting the badge indicative of the credential by the user device; and controlling execution of the one or more operations by the user device according to the one or more user preferences.

18. The system of claim 17, wherein:

accessing the user identity profile for the user comprises:
  determining whether the user identity profile is stored in an identity management database;
  generating the user identity profile in response to determining that the user identity profile is not stored in the identity management database; and
  providing data identifying the user device to the user identity profile in response to determining that the user identity profile is stored in the identity management database, and updating the user identity profile based on one or more interactions of the user comprises one or more of:
  updating one or more of basic user information, biometric information, medical information, health information, social information, behavioral information, commercial information, financial information, contextual information, and location information in the user identity profile;
  receiving a user input to configure one or more of the credential and the trigger condition;
    receiving contextual information for executing an operation;
    receiving an indication that an operation has been selected by the user for execution upon occurrence of the trigger condition; and
    receiving an indication that an operation has been selected for execution by the user device without user input upon occurrence of the trigger condition.

19. The system of claim 17, wherein:

determining that the trigger condition has occurred comprises receiving one or more of a beacon signal or a user input, identifying the one or more operations previously executed by the user device that are indicated by data included in the user identify profile and the one or more user preferences of the user comprises:
  obtaining contextual information that includes one or more of biometric information, credential information, motion information, analytics information, time information, third party information, optical data, transaction type, employer type, and access level type; or
  obtaining data indicative of one or more operations performed in response to receiving the one or more of the beacon signal, the user input, or the indication of the location to output the badge indicative of the credential, and controlling the execution of the one or more operations by the user device comprises:
  controlling the user device to display the badge, the badge being customized based on the contextual information;
  receiving a second input through the displayed badge;
  controlling execution of a function in response to the received second input;
  updating a display of the badge to reflect execution of the function; and
  updating the user profile based on one or more of the credential, the contextual information, the second input, and the executed function.

20. The system of claim 17, wherein:

the one or more user preferences include a preference to execute the one or more operations without receiving a user input and without the one or more processors generating a query that requests the user to confirm execution of the one or more operations; and controlling the execution of the one or more operations by the user device according to the one or more user preferences comprises:
  controlling the execution of the one or more operations by the user device without receiving a user input after the trigger condition has occurred.

* * * * *

UNITED STATES PATENT AND TRADEMARK OFFICE
CERTIFICATE OF CORRECTION

PATENT NO. : 10,237,256 B1
APPLICATION NO. : 15/006949
DATED : March 19, 2019
INVENTOR(S) : Victor Pena et al.

Page 1 of 1

It is certified that error appears in the above-identified patent and that said Letters Patent is hereby corrected as shown below:

In the Claims

In Claim 17, Column 32, Line 58, delete "device," and insert -- device; --, therefor.

Signed and Sealed this
Twelfth Day of May, 2020

Andrei Iancu
*Director of the United States Patent and Trademark Office*